(12) United States Patent
Xu

(10) Patent No.: US 8,884,531 B1
(45) Date of Patent: Nov. 11, 2014

(54) INTELLIGENT SOLAR LIGHTING SYSTEM

(71) Applicant: Test Rite International Co., Ltd., Taipei (TW)

(72) Inventor: Jichang Xu, Shenzhen (CN)

(73) Assignee: Test Rite International Co., Ltd., Taipei (TW)

( * ) Notice: Subject to any disclaimer, the term of this patent is extended or adjusted under 35 U.S.C. 154(b) by 0 days.

(21) Appl. No.: 13/962,280

(22) Filed: Aug. 8, 2013

(51) Int. Cl.
| | |
|---|---|
| H05B 37/02 | (2006.01) |
| H05B 39/04 | (2006.01) |
| H05B 41/36 | (2006.01) |
| F21L 4/00 | (2006.01) |
| H05B 33/08 | (2006.01) |

(52) U.S. Cl.
CPC .................................. *H05B 33/0803* (2013.01)
USPC .......................................... 315/153; 362/183

(58) Field of Classification Search
None
See application file for complete search history.

(56) References Cited

U.S. PATENT DOCUMENTS

| | | | |
|---|---|---|---|
| 4,982,176 A | 1/1991 | Schwarz | |
| 5,747,937 A | 5/1998 | Wiesemann et al. | |
| 7,954,973 B1* | 6/2011 | Holland et al. | 362/146 |
| 8,203,445 B2 | 6/2012 | Recker et al. | |
| 8,497,634 B2* | 7/2013 | Scharf | 315/149 |
| 2010/0201267 A1 | 8/2010 | Bourquin et al. | |
| 2011/0062888 A1* | 3/2011 | Bondy et al. | 315/294 |
| 2011/0304273 A1* | 12/2011 | Bennette | 315/159 |
| 2012/0201016 A1* | 8/2012 | Robertson et al. | 362/183 |
| 2012/0223646 A1 | 9/2012 | Recker et al. | |
| 2012/0306384 A1* | 12/2012 | Chen | 315/159 |

* cited by examiner

*Primary Examiner* — Douglas W Owens
*Assistant Examiner* — Dedei K Hammond
(74) *Attorney, Agent, or Firm* — Treasure IP Group, LLC

(57) ABSTRACT

An area lighting system having a distributed lighting network is provided. The distributed lighting network comprises two main units and multiple secondary units. Both main units are configured to receive a signal from a motion sensor, activate a wireless transceiver and send out a radio frequency signal. In addition, both main units are capable of receiving a radio frequency signal from a wireless transceiver from another main unit. Each secondary units is configured to receive a radio frequency signal from the transceivers of the main units and change the illumination state of the LEDs of the secondary unit.

17 Claims, 26 Drawing Sheets

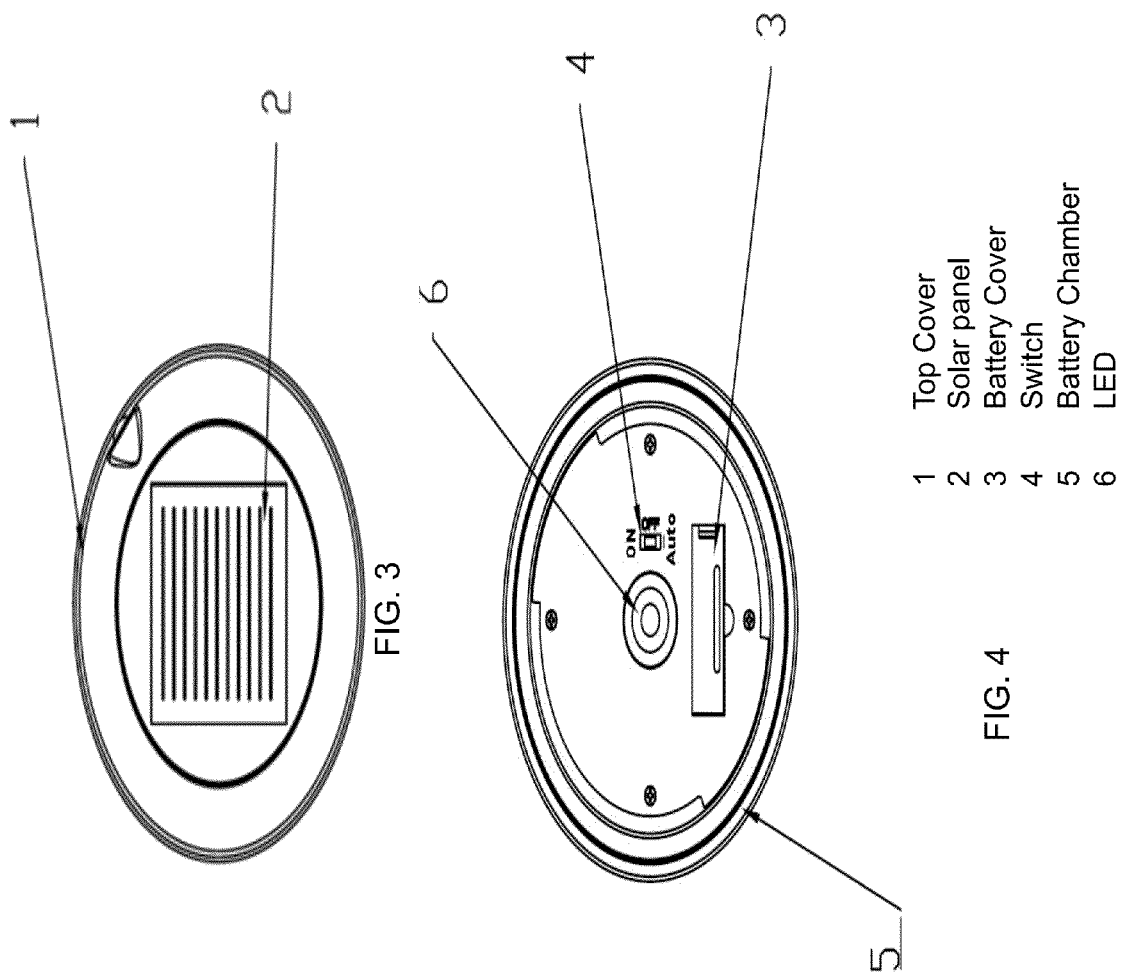

Main unit

7   Solar Panel
8   Top cover
9   PIR Motion Sensor
10  seal ring
11  Lens
12  Fixture
13  PCB
14  Battery Chamber
15  reflector
16  Pole shoe
17  Battery
18  Battery door
19  Screws
20  Lampshade
21  Tube connector
22  Tube
23  Stake 51. Battery over charging protection circuit Circuit diagram for main unit 52. Solar charging circuit 53. PIR motion sensor control circuit 54. Wireless transmitter circuit 55. Battery over-charging protection circuit and solar charging circuit 56. Wireless receiver circuit 57. Light-on period control circuit

| item | Testing Result |
|---|---|
| Main unit motion sensor | 60degree: up to 9.84ft |
| | 45degree: up to 19.7ft |
| | Center: up to 23ft |
| Wireless control for subunit | Corridor: up to 186ft |
| | Open space: up to 120ft |
| Motion active period | Main unit: 1.55minutes |
| | Subunit (5samples): 2.01minutes; 2.02minutes; 2.01minutes; 2.03minutes; 2.02minutes |

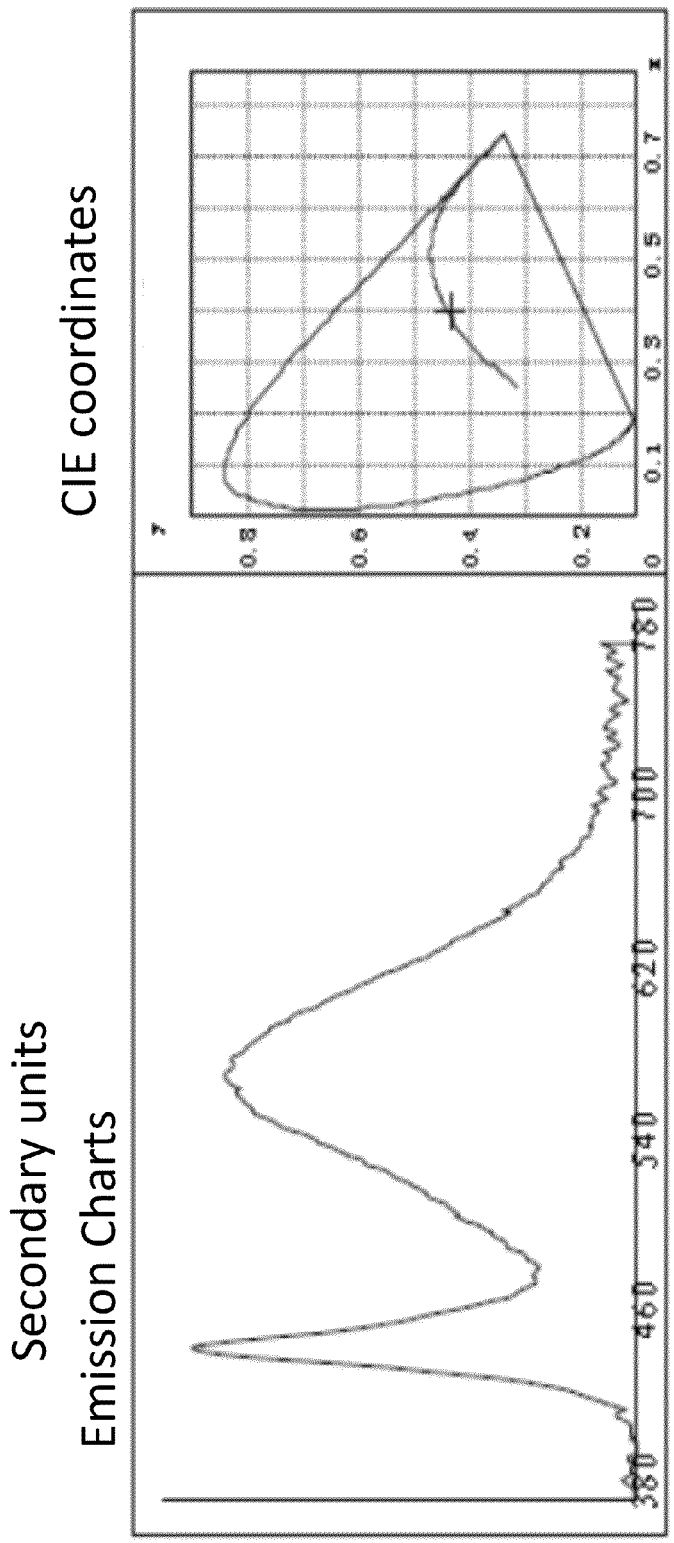

INTELLIGENT SOLAR LIGHTING SYSTEM

BACKGROUND

1. Technical Field

This disclosure is related to motion controlled wireless lighting systems, in particular to, lighting systems powered by solar panels.

2. Description of the Related Art

In recent years, there is a growing trend for consumers to look for more energy efficient and eco-friendly alternative solutions in every day use. LEDs have become more and more widely adopted in residential lighting markets, because of their high power efficiency and long life time. In addition, the technology around solar energy has advanced significantly and has become a viable alternative energy source to provide power in residential households. However, it is still challenging to replace all conventional residential lighting to energy efficient LEDs, powered by solar panels, because of the space requirement, variable weather conditions and cost considerations.

One approach is to design more efficient lighting management systems, offering remote operation through a network. U.S. Patent Publication No. 2007/0057807 discloses a network of luminaire managers so that the lights powering ON and OFF can be more efficiently managed. A network involves a central network server, a GPS to determine each luminaire's grid coordinates and other types of equipment (such as sensors). U.S. Patent Publication No. 2004/0160199 describes attaching a programming device to a lighting device, then selecting a mode, such as programming mode or addressing mode. The programming device may transmit the lighting device's pre-programmed identification code to the central controller, or the central controller may transmit an address to the programming device, which deposits the code into the lighting device's memory. The same programming device is apparently attached to each lighting device in turn.

Solar powered LEDs are good alternatives to conventional light bulbs in specialty lighting segment, such as signage applications and security lightings, which typically require much lower brightness.

The present invention disclosed herein is a lighting system powered by solar power, offering illumination for gardens, pathways, and patios for both decorative and security purposes. Further, the lighting system uses motion sensor technology to further conserve energy to limit LED power use to when a consumer really needs it.

SUMMARY OF THE INVENTION

It is an object of the present invention to provide an intelligent, user-triggered or responsive lighting system to illuminate an area or a path, for example, in a yard or garden of someone's house. It is a further object of the present invention to offer security lighting with pleasant illumination effects, without the sacrifice of power efficiency by using solar powered LEDs. It is another object of the present invention to provide a lighting system, which is easy to assemble, has simple operation instructions and requires a minimum of effort to install.

The present invention provides a lighting system having distributed intelligence, which can be self configured without a remote control or center server. It is a self sustained lighting network powered by solar energy.

In one aspect of the present invention, an area lighting system, having a distributed lighting network, is disclosed. Said area lighting system comprises a main unit and multiple secondary units. The main unit comprises at least one LED and is configured to receive a signal from a motion sensor, modulate an illumination state of the LED based on the signal from the motion sensor, activate a wireless transmitter based on the same signal from the motion sensor and send out a radio frequency signal wirelessly. The secondary units each comprises at least one LED, and are configured to receive radio frequency signals from the transmitter of the main unit and modulate an illumination state of the LED of the secondary unit, wherein each of the main unit and the secondary units is powered by replaceable rechargeable batteries, and said rechargeable batteries are charged by individual solar panels attached thereon.

In another aspect of the present invention, a lighting system comprising LEDs with four illumination states is disclosed. Said lighting system comprises one or more main units, each comprising at least one LED and a controller, wherein at least one main unit is configured to receive a signal from a motion sensor, activate a wireless transmitter based on the signal from the motion sensor and send out a radio frequency signal wirelessly; at least one main unit is capable of receiving the radio frequency signal from the wireless transmitter from another main unit. Said lighting system also comprises a multiple secondary units, each comprising at least one LED and a controller, wherein the each secondary unit is configured to receive the radio frequency signal from the transmitter of the main unit and change the illumination state of the LED of the secondary unit.

In accordance with the present invention, the light emitting diodes (LED) employed in the main units and secondary units, each comprise three illumination states and an OFF state, wherein a first illumination state has luminous flux greater than a second illumination state, a second illumination state has luminous flux greater than a third illumination state, and wherein the LEDs are changed from any other illumination states to the second illumination state through an external switch; and the LEDs are changed from the third illumination state to the first illumination state or from the first illumination state to the third illumination state through the controllers attached thereon, wherein each individual controller has a timing component and brightness component and operate based on the inputs from the signal motion sensors, radio frequency signals, along with the initial illumination state of the LED and the setting of the timing component.

In still another aspect of the present invention, a method of operation is described. The method of operating a lighting system having a distributed lighting network, having a main unit with one LED and a slide switch, and multiple secondary units, each having at least one LED and a slide switch, comprises the steps of:

providing power to each LED in the main and secondary units through the respective rechargeable batteries;

setting external switches of the LEDs to the "Auto" states;

powering on the LEDs in both the main and secondary units in their initial illumination state;

sensing an object through a motion sensor enclosed in the same housing of the LED in the main unit;

operating at least one LED in the main unit to an ACTIVATED state having a high brightness after detecting proximity of an object by the motion sensor;

sending out radio frequency signals to the secondary units;

changing the illumination state of at least one LED in the secondary unit to the ACTIVATED state, having high brightness after receiving a radio frequency signal from the main unit;

changing the illumination state of the LEDs in the main unit from the ACTIVATED states to the STANDBY state after a predetermined time period; and
changing the illumination state of the LEDs in the main unit from the ACTIVATED states to the STANDBY state after another predetermined time period.

BRIEF DESCRIPTION OF THE DRAWINGS

Exemplary embodiments of the disclosure will be more clearly understood from the following detailed description taken in conjunction with the accompanying drawings in which:

FIG. 3 illustrates a top view of exemplary embodiments in FIGS. 1-2;

FIG. 4 illustrates a top view of the top covers of the exemplary embodiments in FIGS. 1-2;

FIG. 18a is an exemplary emission spectrum and CIE coordinate of a, secondary unit;

FIG. 18b is table of summary of brightness with and without a lampshade for an exemplary main unit.

DETAILED DESCRIPTION OF SELECTED EXAMPLES

Figure 1:
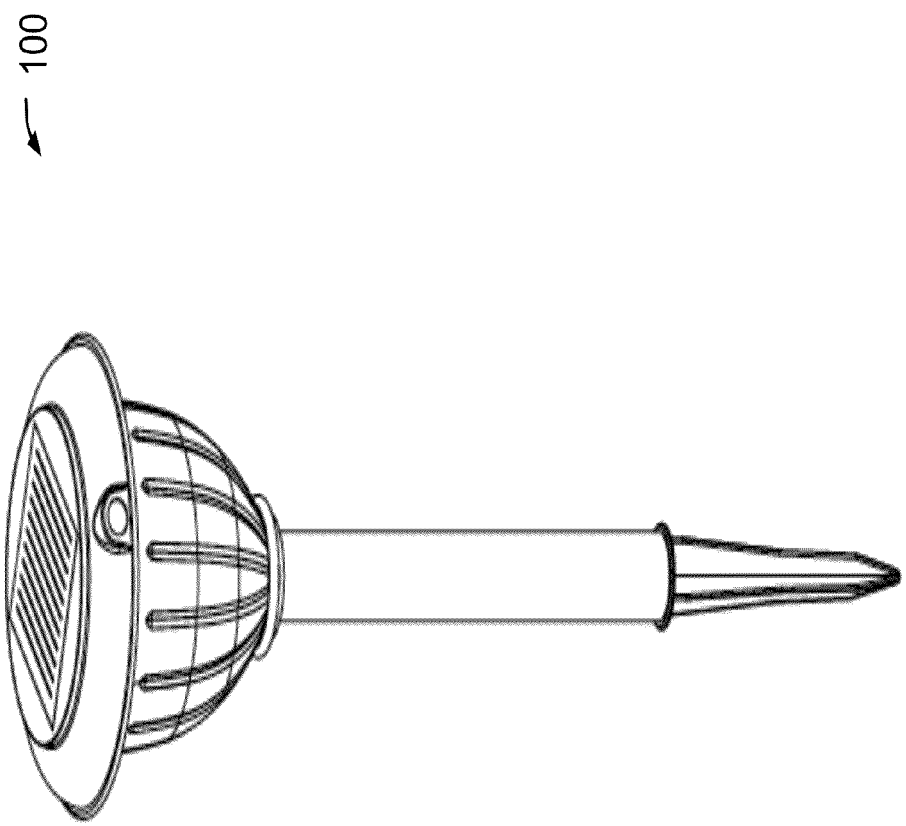
FIG. 1 illustrates a perspective view of one embodiment of a main unit, in accordance with aspects of the present invention.

Hereinafter, selected examples of area lighting systems will be discussed in the following with reference to the accompanying drawings. It will be appreciated by those skilled in the art that the following discussion is for demonstration purposes and should not be interpreted as a limitation. Other variances within the scope of this disclosure are also applicable.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the term "embodiments of the invention" does not require that all embodiments of the invention include the discussed feature, advantage or mode of operation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

"Optional" or "optionally" means that the subsequently described circumstance may or may not occur, so that the description includes instances where the circumstance occurs and instances where it does not.

"Above" means one element is located on top of another element. In one example, it means one element is situated directly on top of another. In another example, it means one layer is situated over the second element with more elements or spacers in between.

"Controller" in the scope of the present application, refers to the PCB board and all the circuit diagrams printed thereon. "Group(s)" means communication network group(s), wherein at least one unit in the group is in communication wirelessly through radio frequency to a main unit in the same group. Sometimes a group is referred as distributed lighting network in the scope of the present invention.

"Brightness" in the scope of the present invention is measured by Luminous flux, which is defined by the quantity of the energy of the light emitted per second in all directions. The unit of luminous flux is lumen (lm).

In the figures, the following reference numerals are utilized with the respective elements:

1 Top Cover (for both the main and secondary units)
2 Solar panel (for both the main and secondary units)
3 Battery Cover (for both the main and secondary units)
4 Switch (for both the main and secondary units)
5 Battery Chamber (for both the main and secondary units)
6 LED (for both the main and secondary units)
7 Solar Panel (for the main unit)
8 Top cover (for the main unit)
9 Passive Infrared Motion Sensor (for the main unit)
10 Seal ring (for the main unit)
11 Lens (for the main unit)
12 Fixture (for the main unit)
13 PCB (for the main unit)
14 Battery Chamber (for the main unit)
15 Reflector (for the main unit)
16 Pole Shoe (for the main unit)
17 Battery (for the main unit)
18 Battery door (for the main unit)
19 Screws (for the main unit)
10 Lampshade (for the main unit)

21 Tube Connector (for the main unit)
22 Tube (for the main unit)
23 Stake (for the main unit)
24 Solar Panel (for the secondary unit)
25 Top cover (for the secondary unit)
26 PCB (for the secondary unit)
27 Battery Chamber (for the secondary unit)
28 Reflector (for the secondary unit)
29 Pole Shoe (for the secondary unit)
30 Battery (for the secondary unit)
31 Battery door (for the secondary unit)
32 Screws (for the secondary unit)
33 Lampshade (for the secondary unit)
34 Tube Connector (for the secondary unit)
35 Tube (for the secondary unit)
36 Stake (for the secondary unit)
37 Solar charging circuit
38 Overcharge protection circuit
39 Rechargeable battery power supply
40 "Auto/Off/On" slide switch control
41 Illumination brightness and activation period control circuit
42 LED light element
43 An exemplary main unit
44 Additional main units
45 Another exemplary main units
46 One of wireless controlled secondary unit (or secondary unit)
47 Additional exemplary wireless controlled secondary units
48 Solar Power LED Illumination Block
49 Main Unit Block
50 Wireless Controlled Block
51 Battery over-charge protection circuit (for the main unit)
52 Solar charged circuit (for the main unit)
53 PIR motion sensor and light-on period control circuit (for the main unit)
54 Wireless transmitter circuit (for the main unit)
55 Battery over-charge protection circuit and solar charged circuit (for the secondary unit)
56 Wireless receiver circuit (for the secondary unit)
57 Light-on period control circuit (for the secondary unit)

Overview of the System

Described herein is an intelligent area lighting system and method of operation. The intelligent area lighting system provides selective-grouped illumination to the immediate vicinity of a user moving through an open area, a path or semi-open area, by first offering illumination at a low brightness and then switch to high brightness once detecting the presence of a user.

The intelligent area lighting system in the present invention comprises a main unit and multiple secondary units. Each of the main unit and secondary unit are stand-alone, self operate and are self sustained units. Each unit includes an LED light, means for providing power to the lighting element and multiple controlling circuits controlling both the brightness and light-on period of the LED.

Main Unit and Secondary Unit

FIG. 1 provides a perspective view of an exemplary embodiment of a main unit, in accordance with the present invention. The main unit 100, shown in FIG. 1 is a garden light, having a top cover, housing for an LED and a battery, an extension tube and a stake.

Figure 2:
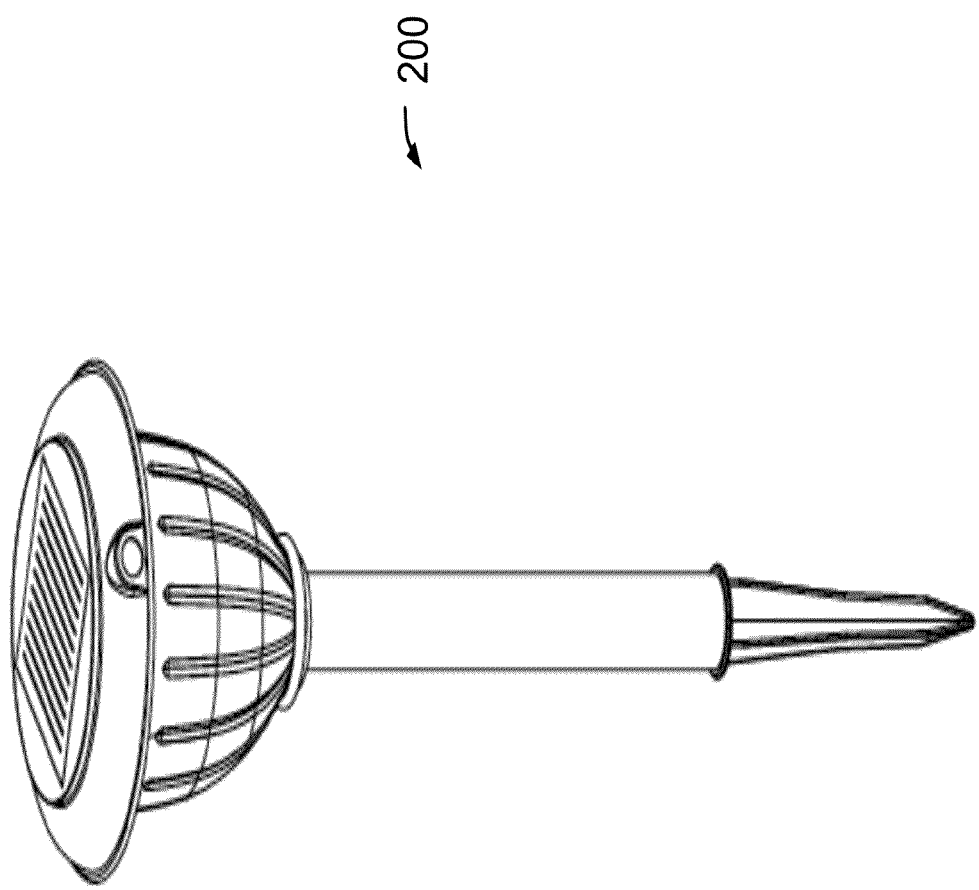
FIG. 2 illustrates a perspective view of one embodiment of a secondary unit.

Similarly, FIG. 2 provides a perspective view of an exemplary embodiment of a secondary unit in accordance with the present invention. The main unit 200, as shown in FIG. 2 is also a garden light, having a top cover, housing for an LED and a battery, an extension tube and a stake.

Although the exemplary main unit and secondary units are the same as that for garden lights in exterior design, as provided in FIGS. 1 and 2, the main unit and secondary units are not limited to the same garden lights. Main units and secondary units can be different in geometry, shape, height and color. Main units and secondary units are different primarily in their role in the communication network of illumination, but they can also differ in exterior design, LED lighting specification, time intervals, and power (both from the battery or solar power capacities).

FIG. 3 provides further details for the main units and secondary units. Viewing from the top, the exemplary main unit 100 in FIG. 1 and exemplary secondary unit 200 in FIG. 2 display their top covers 1, which are substantially round. A solar panel 2 is coaxially affixed directly on the top of the top cover 1, within the inner boundary 300 of the top cover. A solar panel provides energy to the LEDs and other components such as processor in various control circuits through a rechargeable battery. Solar panel 2 may be of any appropriate output power, depending on the location of the main unit and secondary unit and the demands made upon them. Typical systems may use 5 W, 10 W, 20 W or 30 W solar panels. Model CTI-10 solar panels, made by Carmanah Technologies Corp., are examples of appropriate solar panels. Further, the solar panel 2 can be any appropriate size or geometry. The exemplary geometry shown in FIG. 3 is a square or a rectangular, but the solar panels are not limited to such shapes, as long as they are compatible with the shapes of other components for aesthetic purposes, and the shapes are not too costly to manufacture.

FIG. 4 offers a simplified schematic view of the battery chamber 5 located underneath the solar cell 2 and the top cover 1. The battery chamber is also substantially round and coaxially fixed with the top cover. In the battery chamber away from the center, a battery door or battery cover 3 is provided. A battery or batteries are placed inside the cavity under the battery cover 3 to provide energy for LED power on and the other components inside the main unit and secondary units. Battery 17 for the main unit and battery 30 for the secondary unit, can be can be any number and/or type of battery. For instance, the batteries 17 and 30 can be rechargeable batteries. According to another example, the battery 17 and 30 can be non-rechargeable batteries. In one known instance, three "AAA" size alkaline batteries are used. In an alternative instance, three "C" size alkaline batteries are used. It should be understood that the number of known batteries may be used, including without limitation all known alkaline. lithium and nickel-cadmium batteries, depending on size and power requirements for the main unit and secondary units.

In accordance with the aspects of the present invention, batteries are used instead of an external power source to supply power to the main unit and secondary unit to avoid aesthetically unpleasing wiring and/or potentially inconvenient cords. In one example of the present invention, the rechargeable battery is charged by a solar cell as a power source for the main and secondary units. In another example, a non-rechargeable or rechargeable battery is used as a supplement for the power provided by the solar cell. The power source for units in the intelligent area lighting system can use or can be a combination of power sources, a solar cell and one or more rechargeable or non-rechargeable batteries. In general, batteries can supplement the power supplied by the solar cell (or vice versa) and/or the solar cell can recharge a battery.

Figure 5:
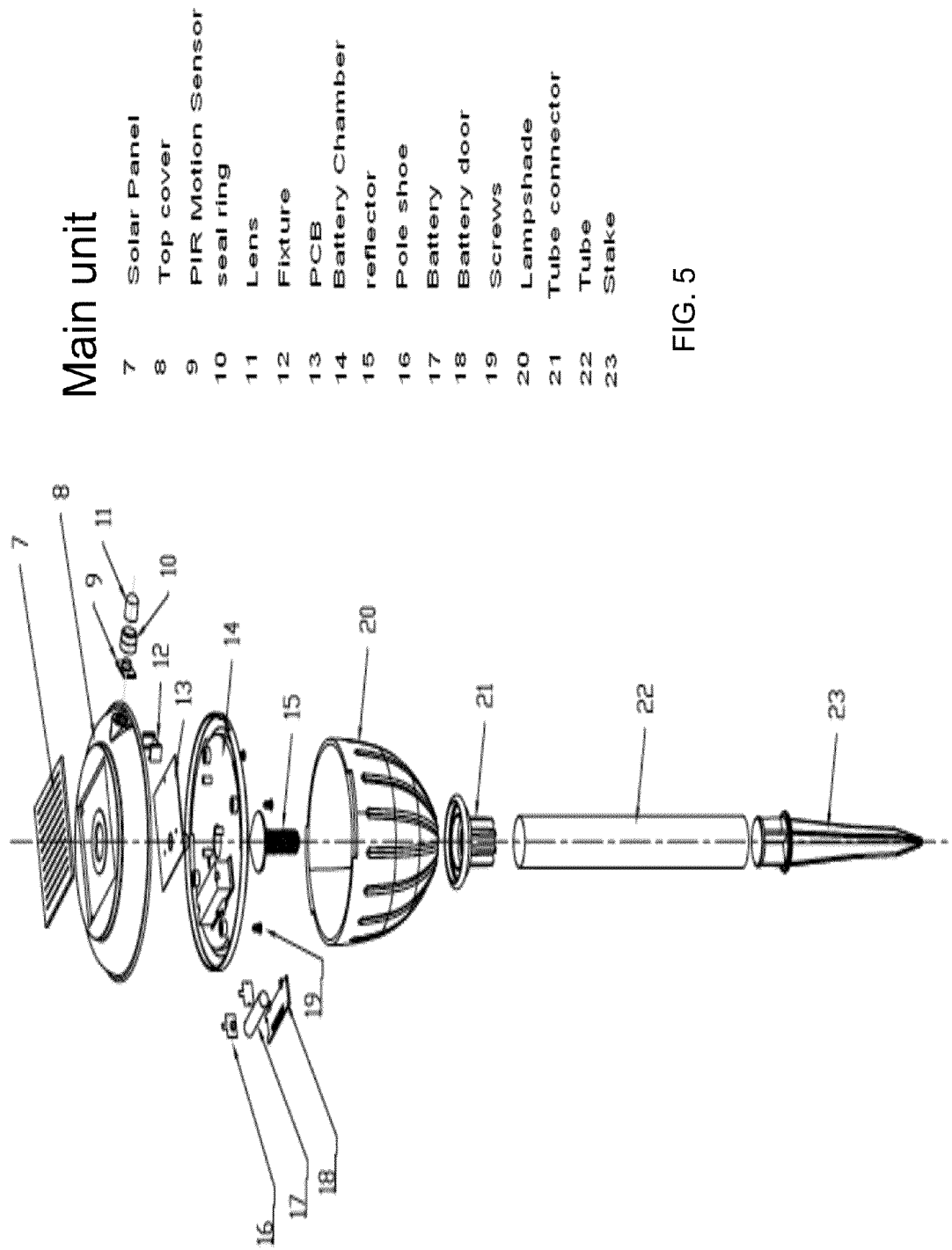
FIG. 5 illustrates an exploded view of an exemplary embodiment of a main unit, in accordance with aspects of the present invention.
Figure 6:
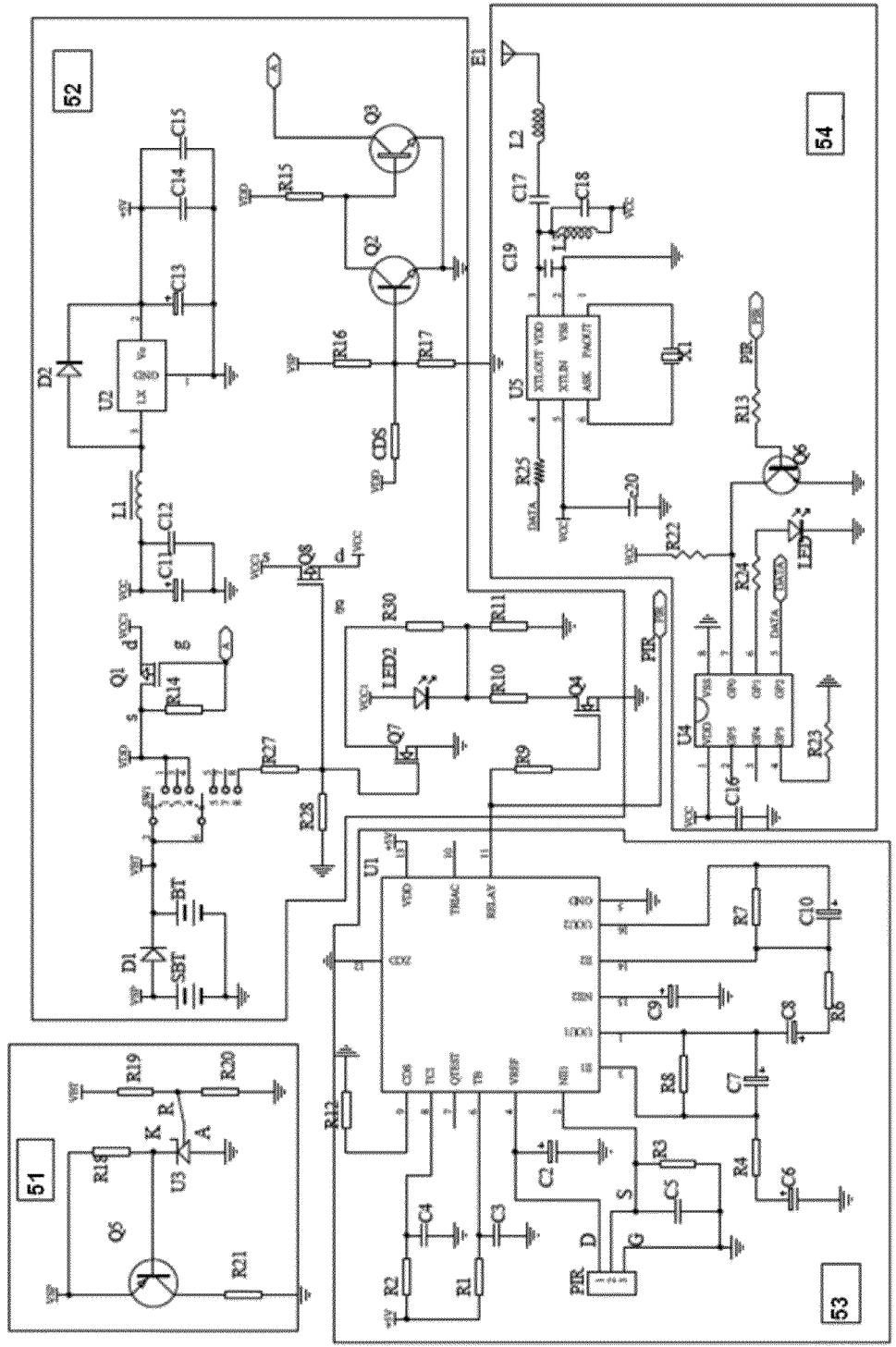
FIGS. 6a-d diagrammatically illustrate an exemplary circuit diagram of the main unit, in accordance with the aspects of the present invention.
Figure 6A:
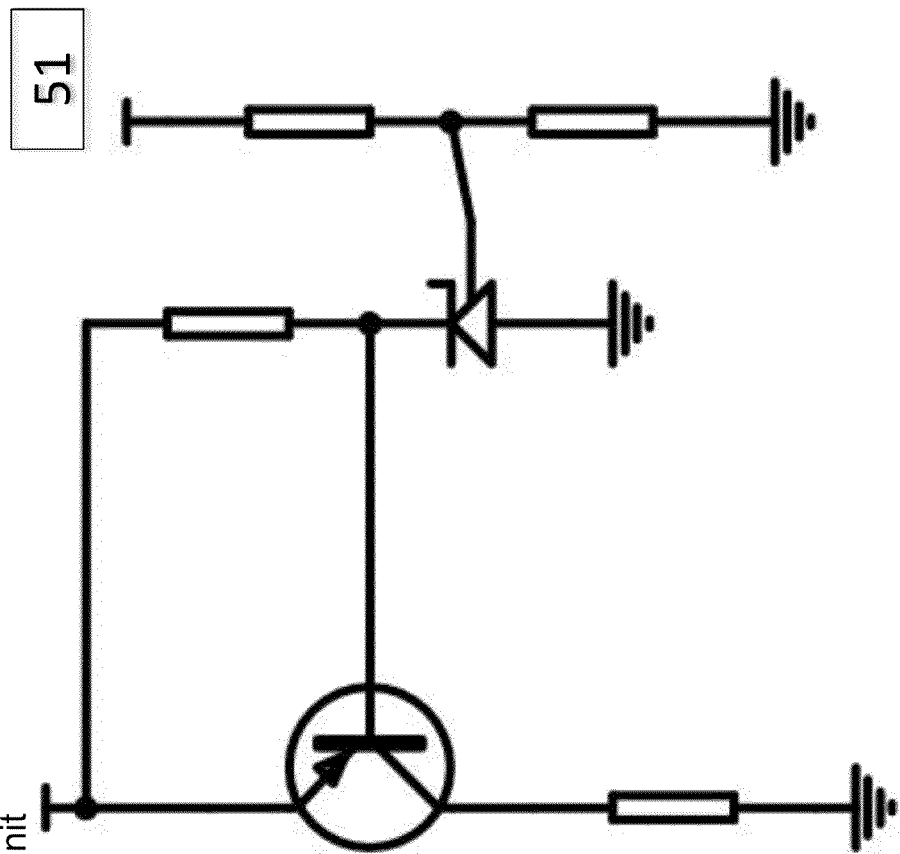
Figure 6B:
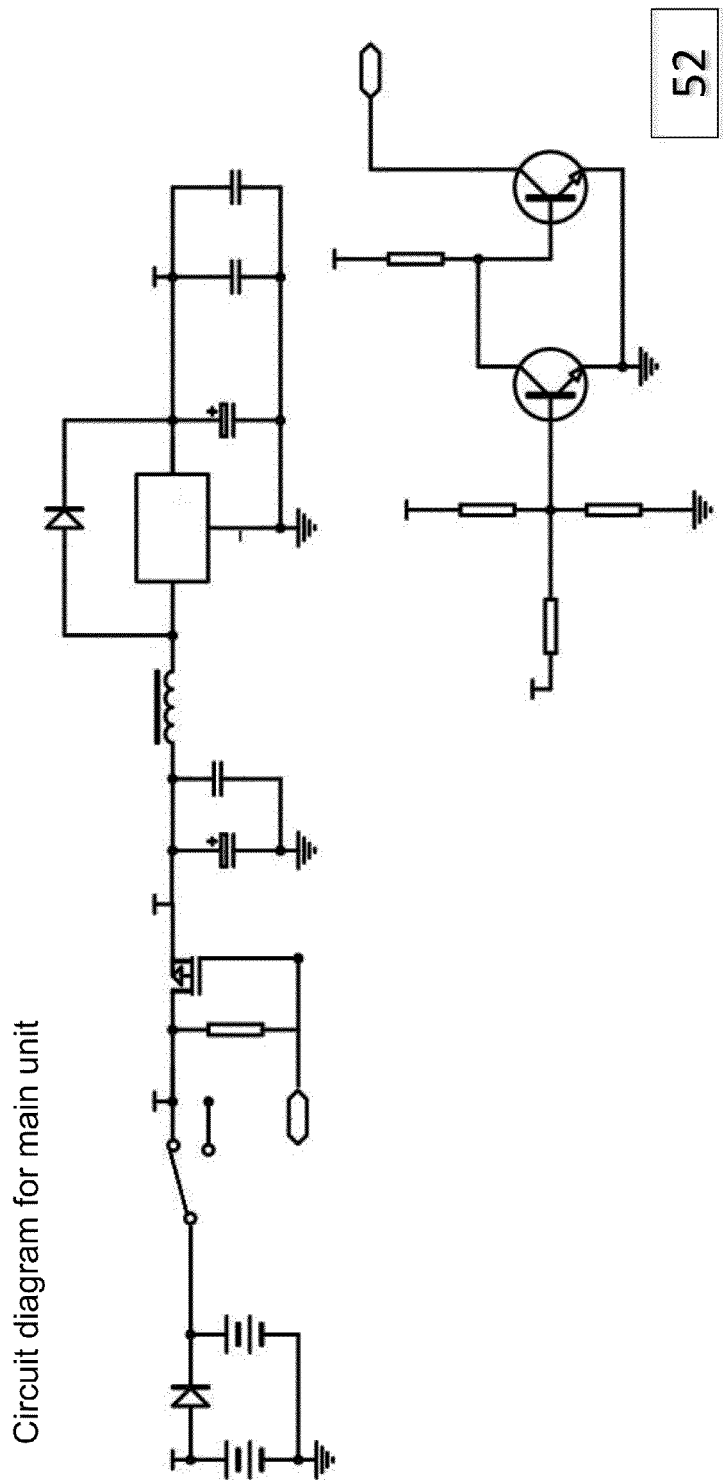
Figure 6C:
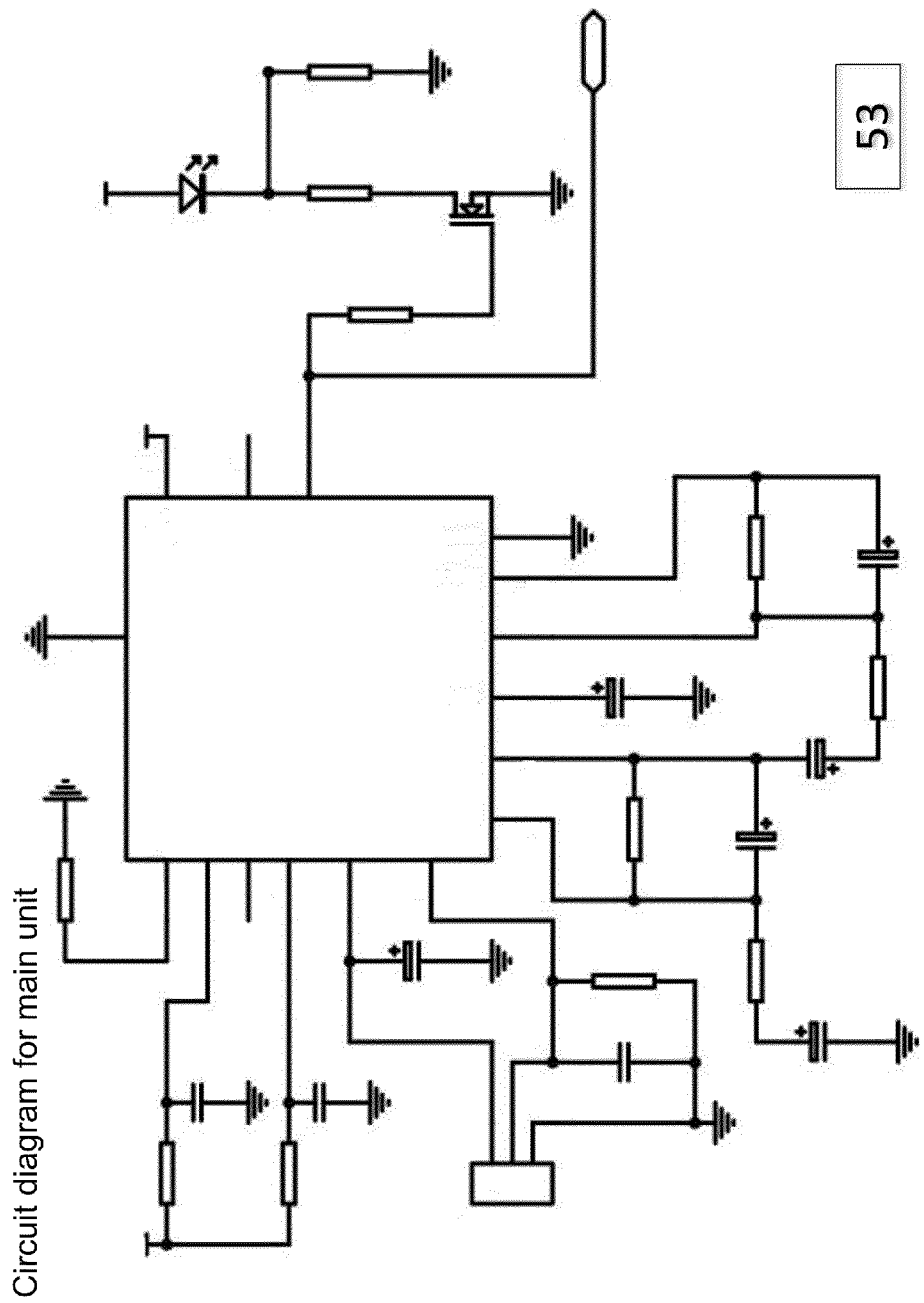
Figure 6D:
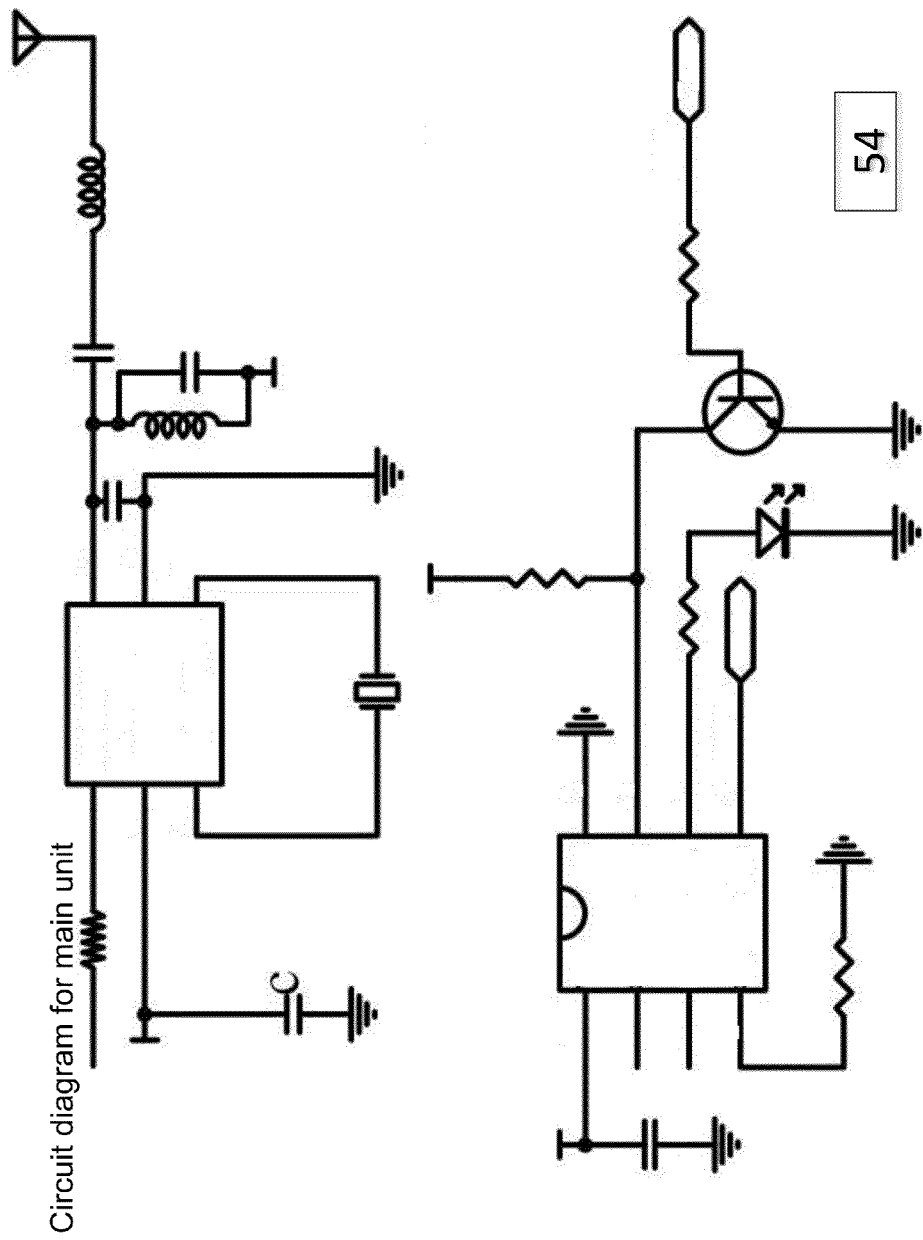
Figure 7:
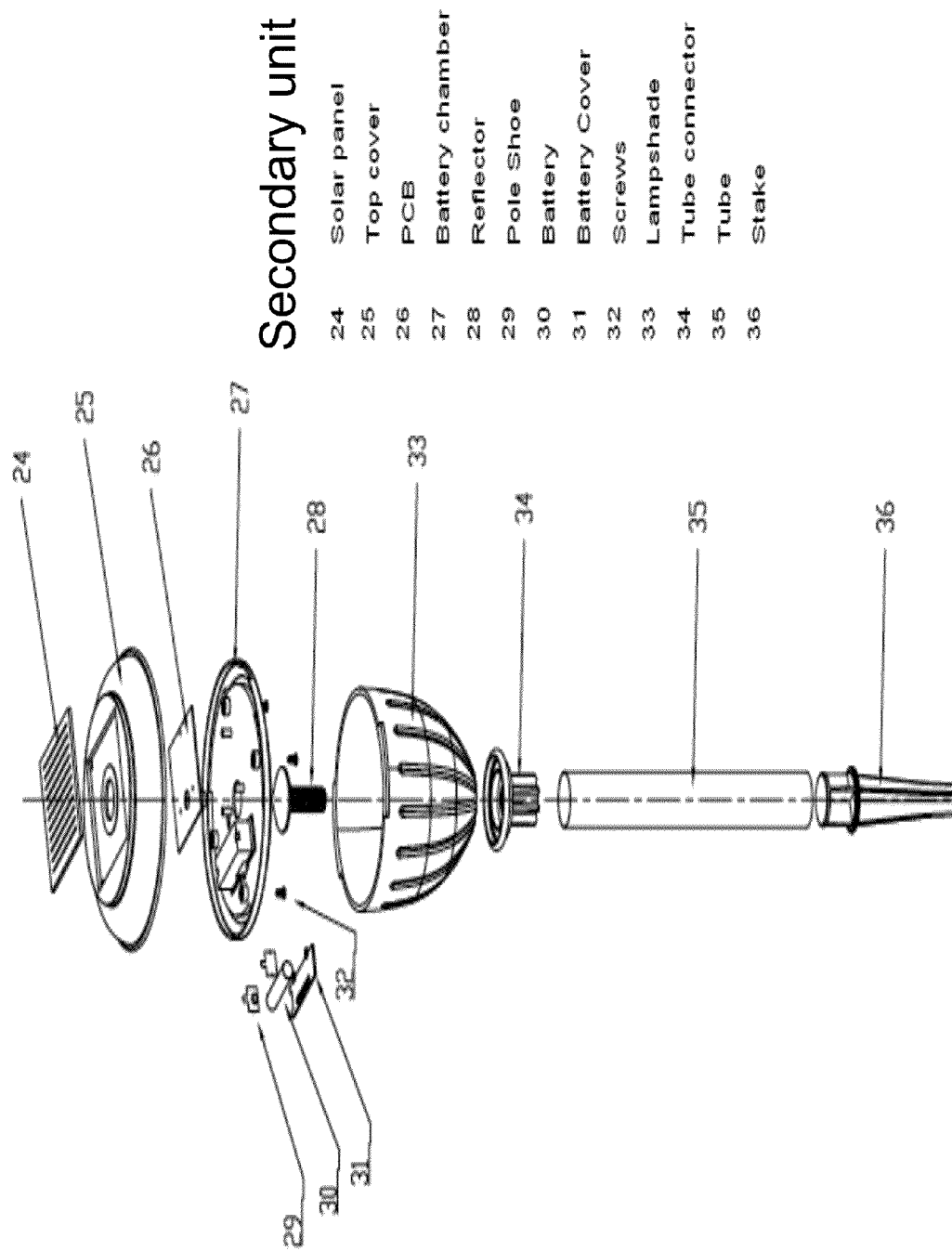
FIG. 7 illustrates an exploded view of exemplary embodiment of a secondary unit, in accordance with aspects of the present invention.
Figures 17A, 17B:
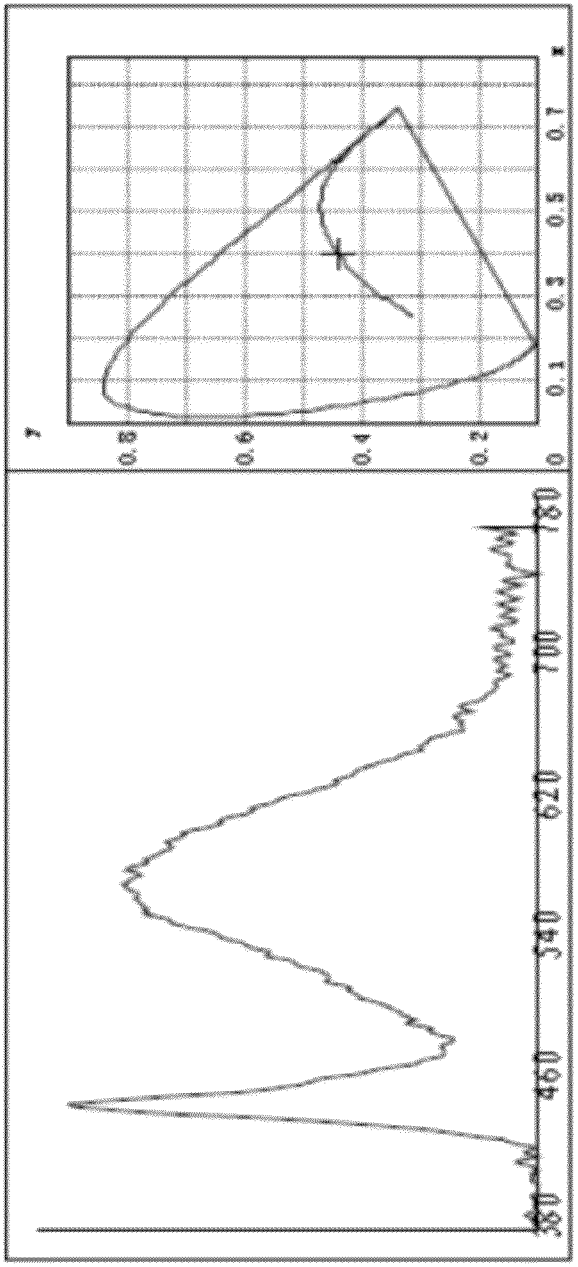
FIG. 17a is an exemplary emission spectrum and CIE coordinate of a main unit.
FIG. 17b is table of summary of brightness with and without lampshade for an exemplary main unit.

Referring to FIGS. 4, 5 and 7, a light element is fixed in the battery chamber. The light element can be any type and any number of LEDs in any arrangement. In the example shown in FIGS. 4, 5 and 7, a LED light 6 is fixed in the battery chamber. In another example, more than one LEDs are used. In the example shown, one LED is fixed in the center of or slightly above the battery chamber. In another example, the LEDs are arranged in a circular shape, or rows or columns, directly underneath the solar cell. The LED light employed in the main and secondary units, can offer three illumination states. A first illumination state is an "ACTIVATED" state, with high brightness. A second illumination state is an "ALWAYS ON" state, having medium brightness. A third illumination state is a "STAND BY" state, having low brightness. Described herein, the first illumination state has the highest brightness and the third illumination state has the lowest brightness. Brightness in the present invention is measured by luminous flux of the LED. High brightness of the "ACTIVATED" state has a higher luminous flux than medium brightness of the "ALWAYS ON" state, which in turn has a higher luminous flux than medium brightness of the "STAND BY" state. The LED further comprises an "OFF" state, when the light is completely off. In one example, "ACTIVATED" state, which offers the brightest illumination, is used in the dark and allows the user to pass through with good visibility. "ALWAYS ON" state is used when continuous lighting is desired, ambient light is not strong or additional lighting is necessary to compensate for the weather conditions to provide a reasonable visibility. "STAND BY" state gives dim light at a brightness having a decorative or pleasing effect. In one example of the present invention, as illustrated in FIGS. 17 and 18, when the LED employed is in the first illumination state, "ACTIVATED" or "motion activated state," it offers brightness in the ranges of 22-31 lumens; when the LED employed is in the second illumination state, "ALWAYS ON" state, it offers brightness in the ranges of 10-14 lumens; and when the LED employed is in the third illumination state, "STAND BY" state, it offers brightness in the ranges of 4-7 lumens. Depending on the number of the LEDs employed in each main and secondary units, the total number of main and secondary units used in the area lighting system, and size of the area to be illuminated, the individual brightness of the LED in each illumination states can be further adjusted or tailed by controllers.

Next to the light element, close to the battery door, a manual switch 4 is provided. The manual switch has three levels and can adjust LEDs to distinct illumination states, besides turning the LED off. One level of the switch is an ON, wherein the light element is turned on. In a known example of the invention, the LED is turned on to the "ALWAYS ON" state. Another level of the switch is AUTO, wherein the manual switch gives up its control of the light element to a controller enclosed in the same unit. Still another level of the manual switch is OFF, wherein the light element is in a power off state. The manual switch can change the LED from the OFF state, to the ON state, which corresponds to the second illumination state of the LED, offering medium brightness and vice versa. Further, the manual switch can change the LED from either the OFF state or the ON state to an AUTO state when the controller of the LED determines the brightness or illumination state of the LED. When the LED is in AUTO state, the LED is standby mode until a motion sensor detects a signal, changing the LED illumination state from "STAND BY" to "ACTIVATED". When the manual switch is changed from ON or OFF to AUTO, the initial state of the LED is in "STAND BY" mode, which corresponds to a third illumination state having low brightness. The manual switch can change the OLED from OFF or "ALWAYS ON" state, i.e. the second illumination state offering a medium brightness, to the third illumination state having a low brightness, but can not change to the "ACTIVATED" state, i.e. the first illumination state having high brightness directly. The manual switch can change the LED from any illumination state to the OFF state or "ALWAYS ON" state, i.e. the second illumination state directly or "STAND BY state". The illumination states of the LED can be reset by using the manual switch. The manual switch can not set LED to the first illumination state, i.e. the "ACTIVATED" state.

In the above examples of the present invention, the manual switch can change the intensity of the LED and determine when the LED is on or off. In another example of the present invention, when there are one or more LEDs employed, the manual switch can further have settings to determine which and how many LEDs are on at the same time. If the LEDs have different colors or emission spectra, then the manual switch can further determine the color of the emission to the exterior environment.

In one example of the present invention, the manual switch is a slide switch. But all other types of switches can be used as long as they meet the space and operation requirement.

FIG. 5 is an exploded view of an exemplary main unit of the present invention. Besides the solar panel 7, top cover 8 and LED, which has been discussed above, the main unit further comprises a motion sensor 9. The LED in the main unit is associated with a motion sensor for detecting the presence of a user to be illuminated and includes a transmitter for communicating the presence of a user to other units located in proximity to the main unit.

Each main unit comprises a motion sensor attached to the side edge of the top cover. This position allows the motion sensor to be better suited to sense an approaching user. As shown in FIG. 5, motion sensor 9 is fixed on the side edge, which allows the motion sensor 9 have dedicated communication to the LED and PCB of the main unit. Motion sensor 9 may be based on basic passive infrared technology, which simply detects the presence of a user and sends a signal to the processor.

The main unit further comprises a PCB board, which includes four circuit diagrams. The circuit diagrams on the PCB board include a battery over-charge protection circuit 51, a solar charging circuit 52; a motion sensor and LED activation period control circuit 53 and a wireless transmitter circuit 54. A rechargeable battery is charge by the solar charging circuit 52; a battery over-charge protection circuit 51 is placed to protect the battery from being over charged. A motion sensor and LED activation period control circuit 53 and wireless transmitter circuit 54, further comprise processors, capable of changing the signals received from the motion sensor attached on the cover top, to operable instructions to the LEDs, and sending out radio frequency signals wirelessly to other units. In the scope of the present invention, the circuit diagrams on PCB boards are individually or jointly referred to as controller(s) for the light element.

In a particular embodiment of the present invention, the area illumination system comprises more than one main unit. Such main units comprise a wireless transceiver rather than a wireless transmitter. The transceiver allows the main unit to send radio frequency signals to other units and receive radio frequency signals from another main units. An example of a wireless transceiver module is Model No. AC4790, a 900 MHz transceiver produced by AeroComm, Inc. Transceivers, using different frequencies, such as 2.4 GHz.

Referring to FIG. 5, in the main unit a Passive IR motion sensor is assembled on the edge of the top cover with a seal ring 10 and lens 11. A fixture element 12 is used to insure the PCB board is securely sandwiched in between the battery chamber 14 and top cover 8. As shown, the motion sensor, PCB and battery chamber are enclosed in a housing. A reflector 15, situated under the battery chamber, is further used to collect the emission from the LED to the bottom of the housing and redirect to the side of the housing.

The desired housing of the main unit and secondary unit allows the modules to be positioned in substantially any indoor or outdoor location. In the example shown in FIGS. 5 and 7, the housing of the units is substantially half egg shaped. But any other shape can be also used. It is to be appreciated that the housing can be any size and/or shape and is not limited to the depicted illustration.

The housing for the main and secondary units is constructed of plastic. But the housing can be constructed of metal or any other known material. The housing can allow the main and secondary units to be mounted on the side of a deck, stairs, on a mailbox, or on the walls of a basement, garage, storage area, shed, wall unit, hallway, stairway, emergency exit path, in any other indoor transition to outdoor locations, where light may be desired.

In one example, the half egg shaped housing is transparent. Alternatively, the housing may be colored or frosted. In one example, the housing is smooth. In alternative example, the cover may be etched or otherwise textured. As FIGS. 5 and 7 shown, the housing for the main and secondary units comprises lampshades to make the light emission more soothing and pleasing.

FIG. 7 is an exploded view of an exemplary secondary unit in accordance with the present invention. Described herein the secondary unit is substantially the same as the main unit except that secondary unit does not have a motion sensor, and the control circuits on the PCB of the secondary unit only have a receiver instead of a transmitter or a transceiver. The receiver is capable of receiving radio frequency signals from a main unit and translating said signal into digital commands or operable instructions to the LED, which is enclosed in the same secondary unit.

Further the controller for the LED is also different. Illustrated in FIGS. 8*a-c*, the controller on the PCB has three circuits, including a battery over charge protection and solar charging circuit 55, a wireless receiver circuit 56 and a light-on period control circuit 57.

In view of the foregoing, the main unit(s) and secondary units each comprise functional components and structural components. Functional components includes, but are not limited to, solar cells, motions sensors, transmitters, transceivers, LEDs, batteries, controllers, manual switches, and related accessories such as reflectors for the LEDs and seals and lenses for the motion sensors. Structural components include, but are not limited to, the top covers, battery door, housing and other fixture elements such as tubes 22, tube connector 21 and stakes 23, which can be replaced without altering the intended function or illumination protocol.

In exemplary embodiments of the main units and secondary units, in FIGS. 5 and 7, garden lights are depicted. Both the main units and secondary units have the same structural components, including top covers, housing, tube connectors, tubes and stakes. But this embodiment by way of example should not be explained as a limitation. Main units and secondary units can have completely different structural components and be packaged into different light fixtures. In an area lighting system of the present invention, the main units do not have to have the same structural components with each other and secondary units do not have to have the same structural components with each other.

Figure 8A:
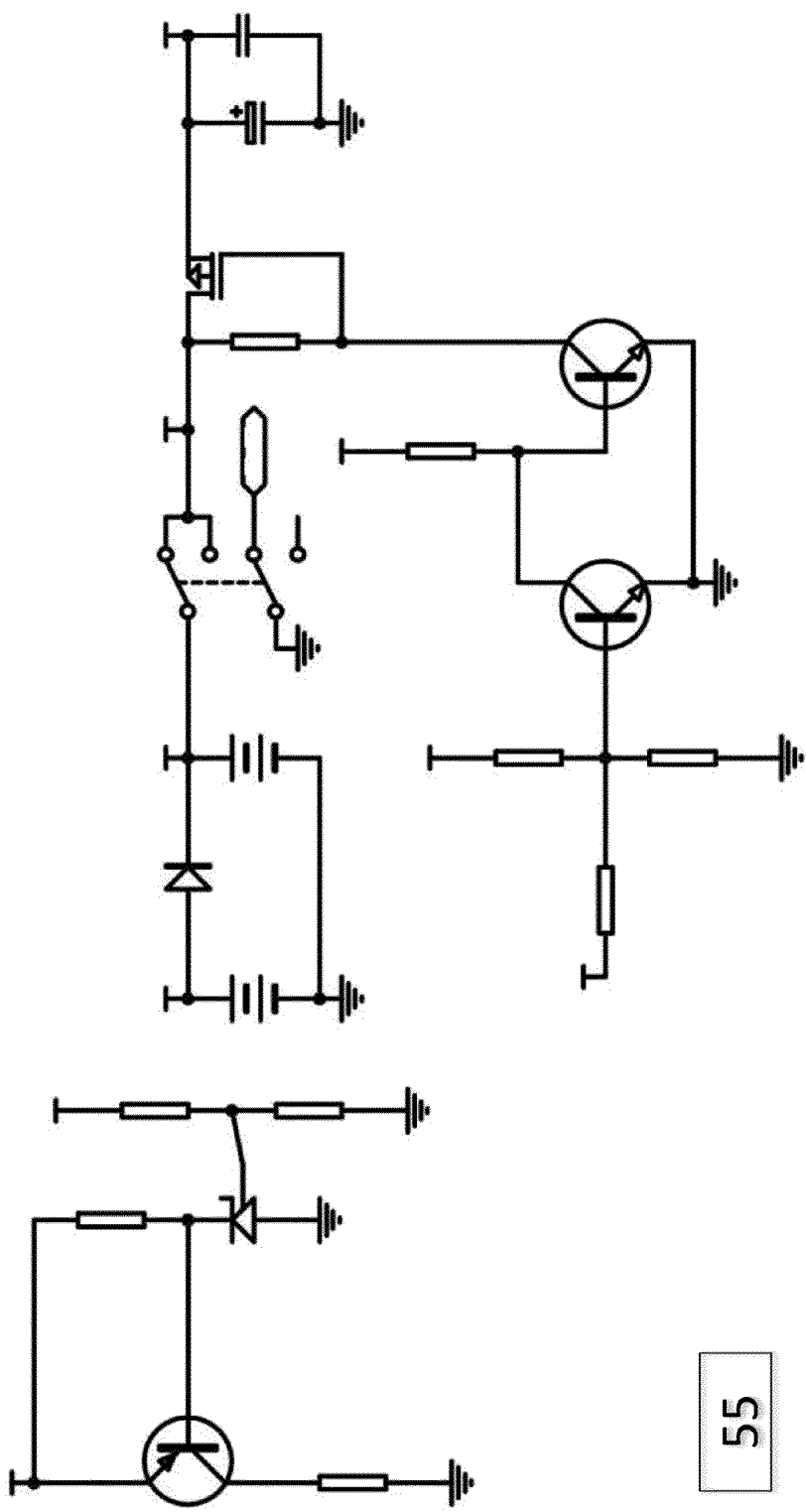
FIGS. 8a-c diagrammatically illustrate an exemplary circuit diagrams of the secondary unit, in accordance with the aspects of the present invention.
Figure 8B:
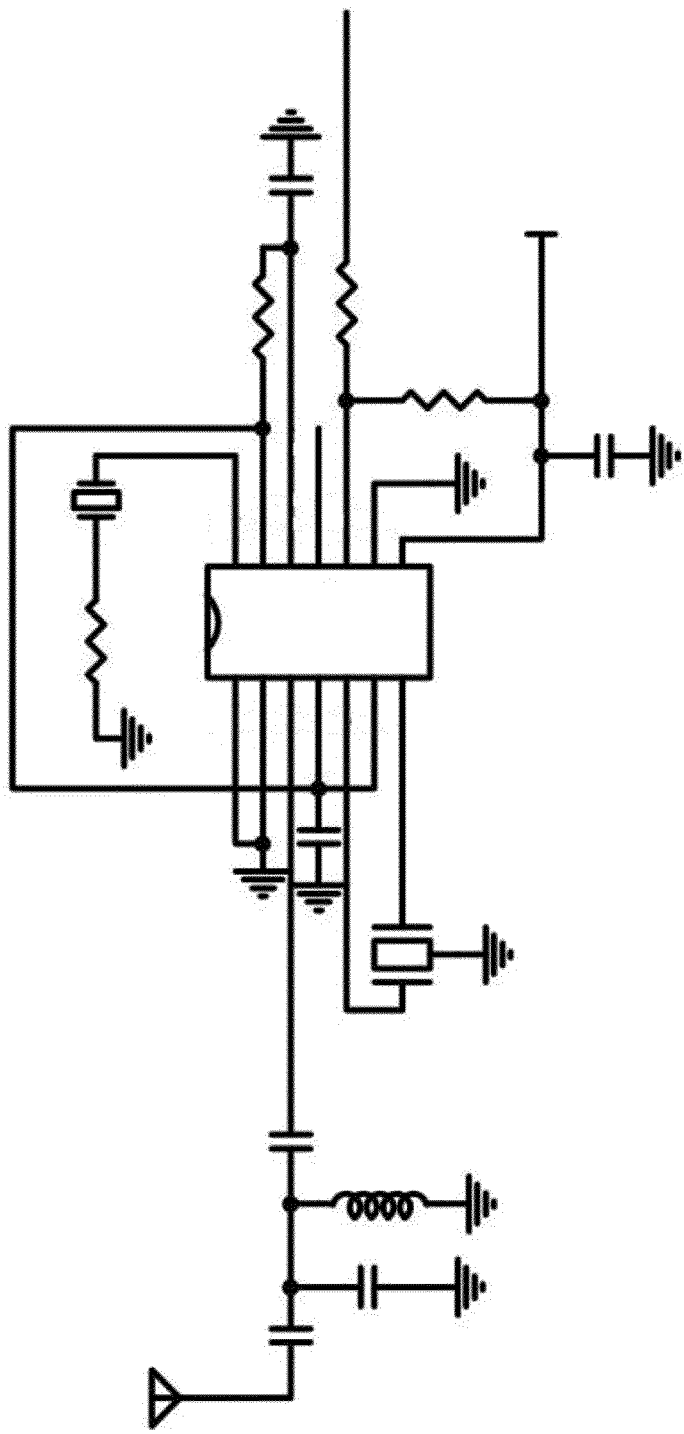
Figure 8C:
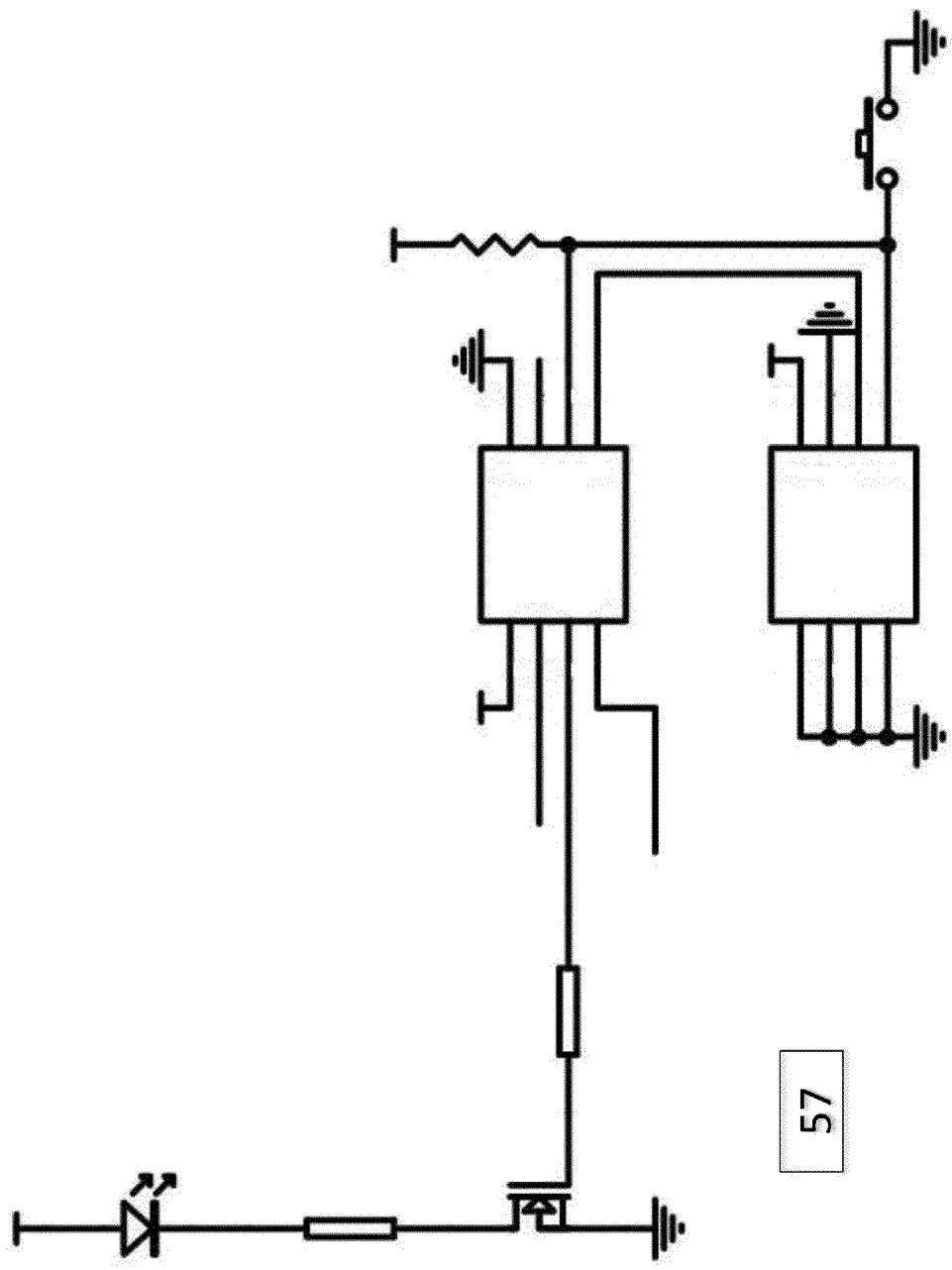

Shown in FIGS. 8*a-c*, a main unit can be packaged as either a mounting light, or a stick garden light. Secondary units can be packaged as stick garden lights, post cap lights or mounting lights. The stick garden lights and post cap lights can be further arranged linearly, into path lights for gardens or any type of open or semi-open area. The mounting lights can be further mounted to the side of stairs to make it a deck light or security light in general. In one example of the present invention, one main unit and one secondary unit are neighbors to each other in a linear path light arrangement, with the main unit having the same structural components and perspective view with the neighboring secondary unit. In another example of the present invention, the main unit is located at the house entrance and the secondary units are arranged linearly along the sides of garden paths, extended from the house entrance, wherein the main unit is a mounting light, and in one instance, the secondary units are stick garden lights; in another instance, the secondary units are post cap garden lights; and still in another instance, the secondary units are a combination of stick garden lights and post cap garden lights.

Arrangements of Main Unit(s) and Secondary Units in an Area Lighting System

The object of the invention is to provide area lighting using point source lighting element, such as LEDs. LEDs are arranged in groups, wherein each group is distributed in a lighting network. Each group has at least one main unit and multiple secondary units. In one example of the present invention, a user's front yard has one group of units and the user's back yard has another group of main and secondary units.

The number of main units and secondary units in each group is not limited, but is decided by the dimension of the area to be illuminated and the brightness desired.

Figure 9:
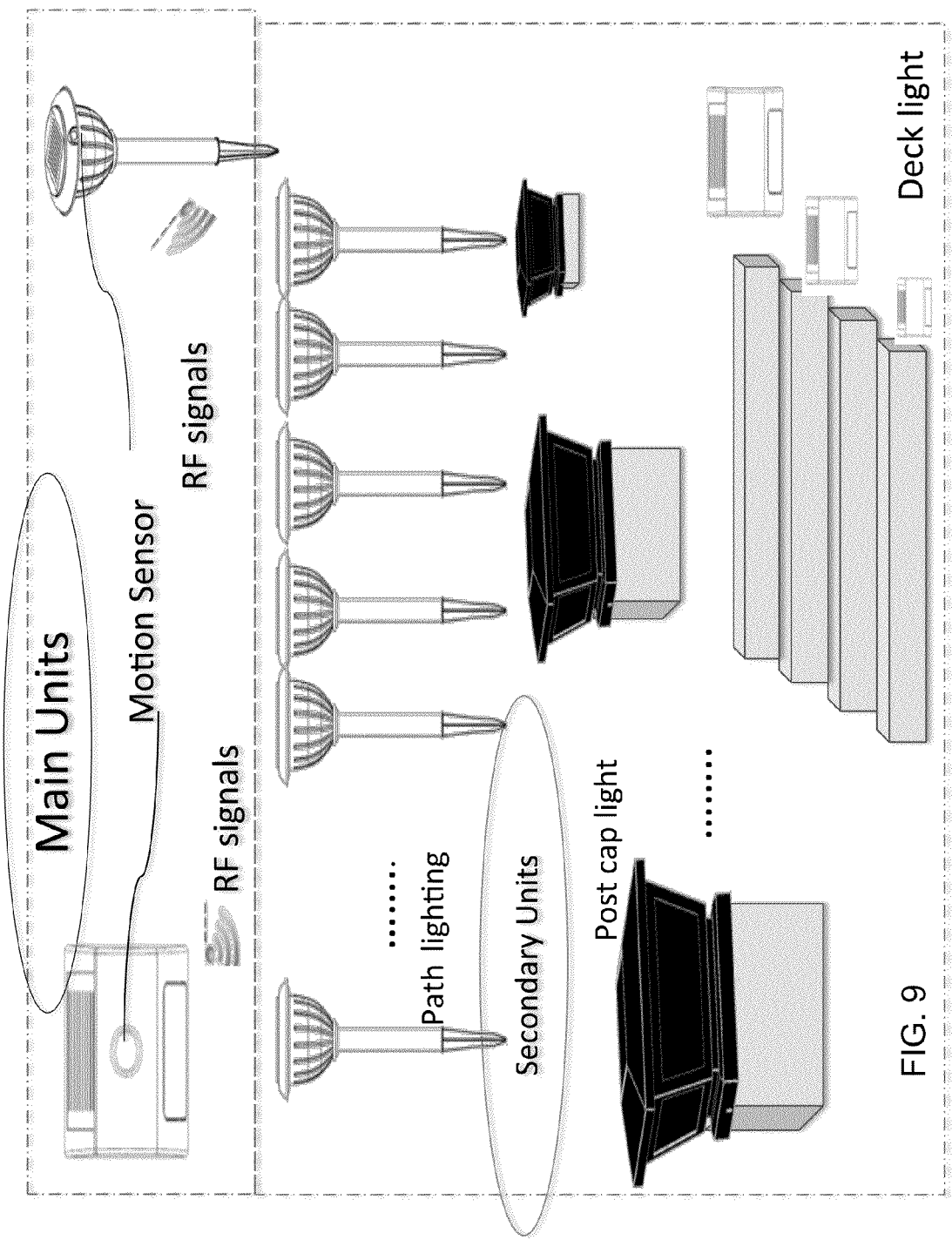
FIG. 9 is a planar view layout of a plurality of main units and secondary units according to the preferred embodiment of the invention.

In one example, suggested by FIG. 9, there is one main unit in the system, and there are up to 50 secondary units. In another example, suggested by FIG. 10, there are up to 49 main units and up to 50 secondary units. In an alternative example, the distributed light network comprises one main unit and 6 secondary units. In another alternative example, the distributed light network comprises two main units and 5 secondary units.

In one example in accordance with the aspects of the present invention, the wireless receiver can receive signals up to 180 ft. In the known example, one secondary unit is positioned less than 180 ft to the main unit in a three dimensional space.

In one example, the main unit is located away from the secondary unit. In another example, the main unit is located in close proximity to two secondary units. In still another example, the units in a distributed network are arranged linearly with uniform distance between them to offer a continuous path light.

In general, the main and secondary units can be arranged in any configuration to provide into a networked system. Preferably, the units may be selectively configured for either radial or path-wise operation.

In one example of the present invention, the units in the networked lighting system are arranged so that an area of 20 square feet can be lit up and activated at once.

In one aspect of the present invention, the main units and secondary units are arranged to offer continuous lighting in one dimension, such as a path light. In another aspect of the present invention, the units are arranged sporadically to offer a more user desired decorative effect.

Working Principle

In accordance with the aspects of the present invention, the intelligent area lighting system has a distributed network or group, which comprises a main unit and multiple secondary units. The illumination of main units and secondary units is altered to similar brightness in groups. The main unit changes the brightness of the LED based on an input from a Passive IR motion sensor, whereas the secondary units alter the illumination correspondingly based on the radio frequency signals received from the main unit. Essentially, the instructions to activate the LEDs are distributed to a group of secondary units from the main unit.

Each group has at least one main unit. When all the units in the group are set to "AUTO" by their individual manual switch and in their STAND BY state, the main unit acts as a commander-in-chief. The main unit includes a passive infrared sensor configured to detect motion. In one example, the passive infrared sensor has a range of approximately 5 feet and a viewing angle of 110 degrees. In alternative embodiments, the passive infrared sensor may have a range up to 10 feet and viewing angle of 60 degrees. In another embodiment, the passive infrared sensor may have a range up to 20 feet and a viewing angle of 45 degrees.

Figure 10:
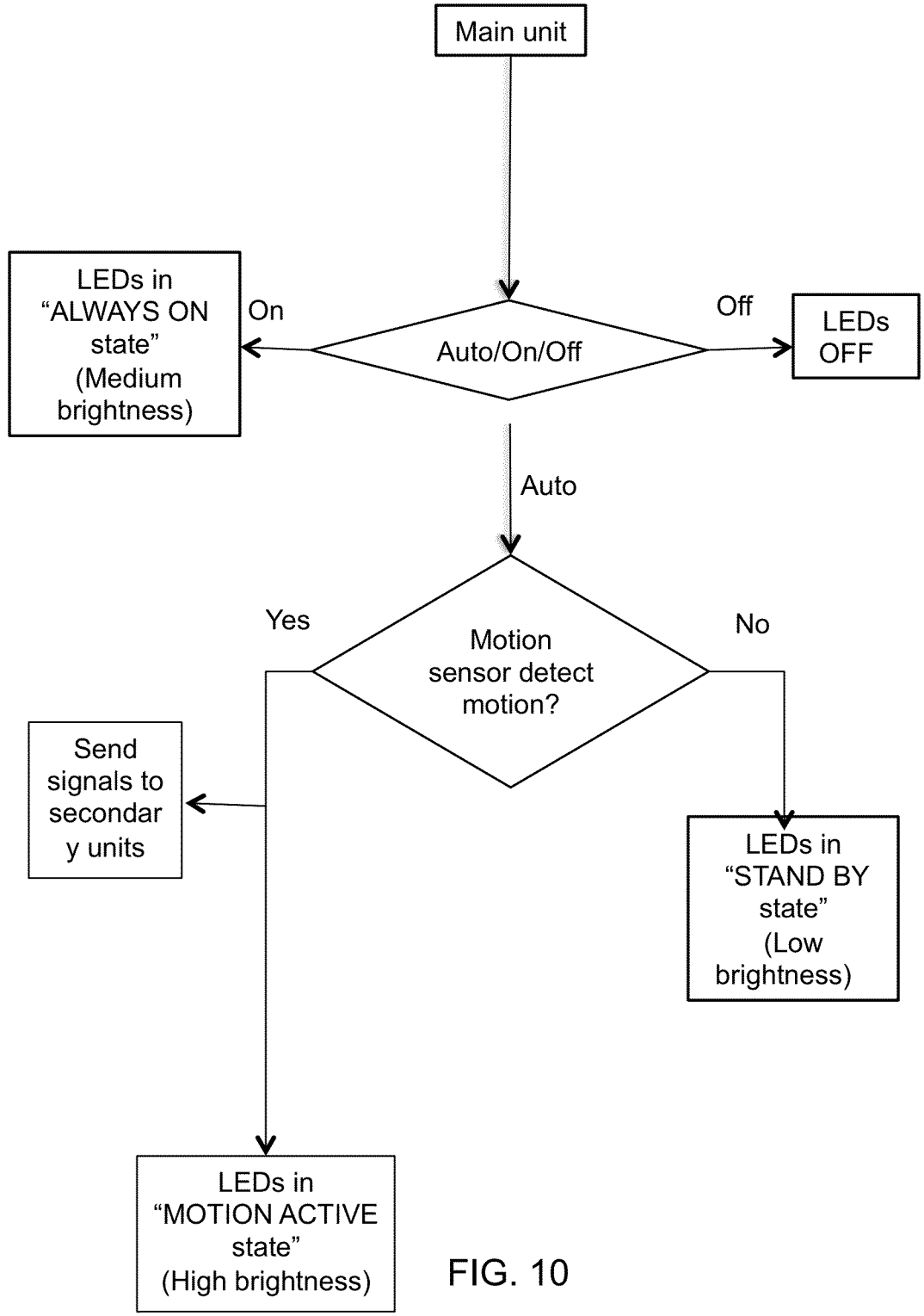
FIG. 10 is a flow chart illustrating an exemplary operation principle of one embodiment of the present invention.

Referring to FIG. 10, in the main unit when the motion sensor 9 detects motion, the control circuit 53 determines if the motion is above a predetermined threshold. If the motion is above the predetermined threshold, the logic in the control circuit 53 instructs the LED controller in circuit 53 to turn on the LED. After the LED is turned to the ACTIVATED state, the logic in control circuit 53 starts a timer. The timer determines the activation period for the LED. The logic in control circuit 53 will then instruct the LED controller logic to change the same LED to STANDBY state if no motion is detected before the timer reaches a predetermined threshold. In one example of the present invention, the activation period of the LED is 1.5-2.5 minutes.

Referring to FIG. 10, in the main unit when the motion sensor 9 detects motion and the LED of the main unit is turned on simultaneously, a radio frequency signal is sent out by a transmitter in the control circuit 53.

When a motion sensor detects a signal, in one example, the input is compared to a threshold, and evaluates to determine whether a condition has been met, based upon retrieved instructions corresponding to the input retained in memory.

The controller in the main unit has a time component to determine the activation period for the LED and also has a brightness component to adjust the brightness of the LED from one illumination to another illumination state. The time and brightness settings of the controller can be changed or reset by the user.

Figure 11:
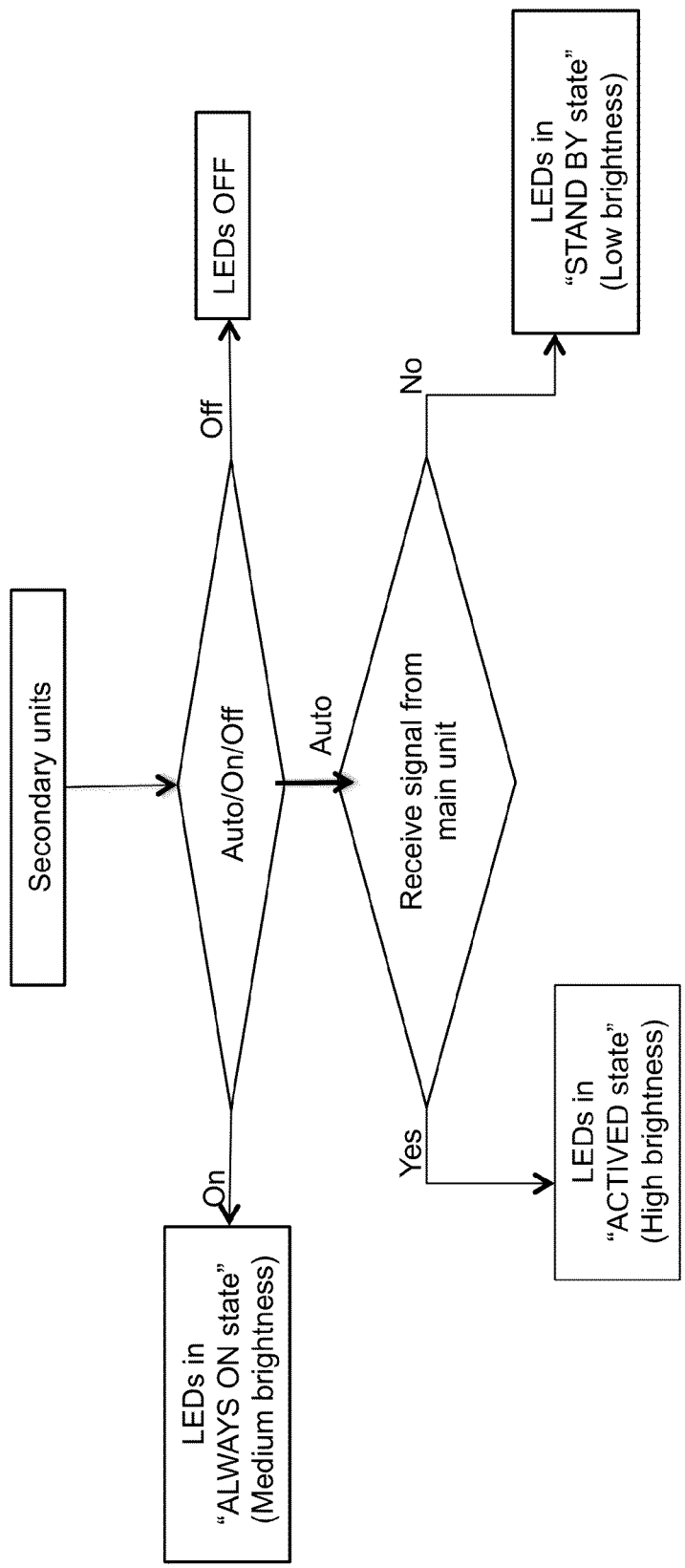
FIG. 11 is a flow chart illustrating an exemplary operation principle of another embodiment of the present invention.
Figure 12:
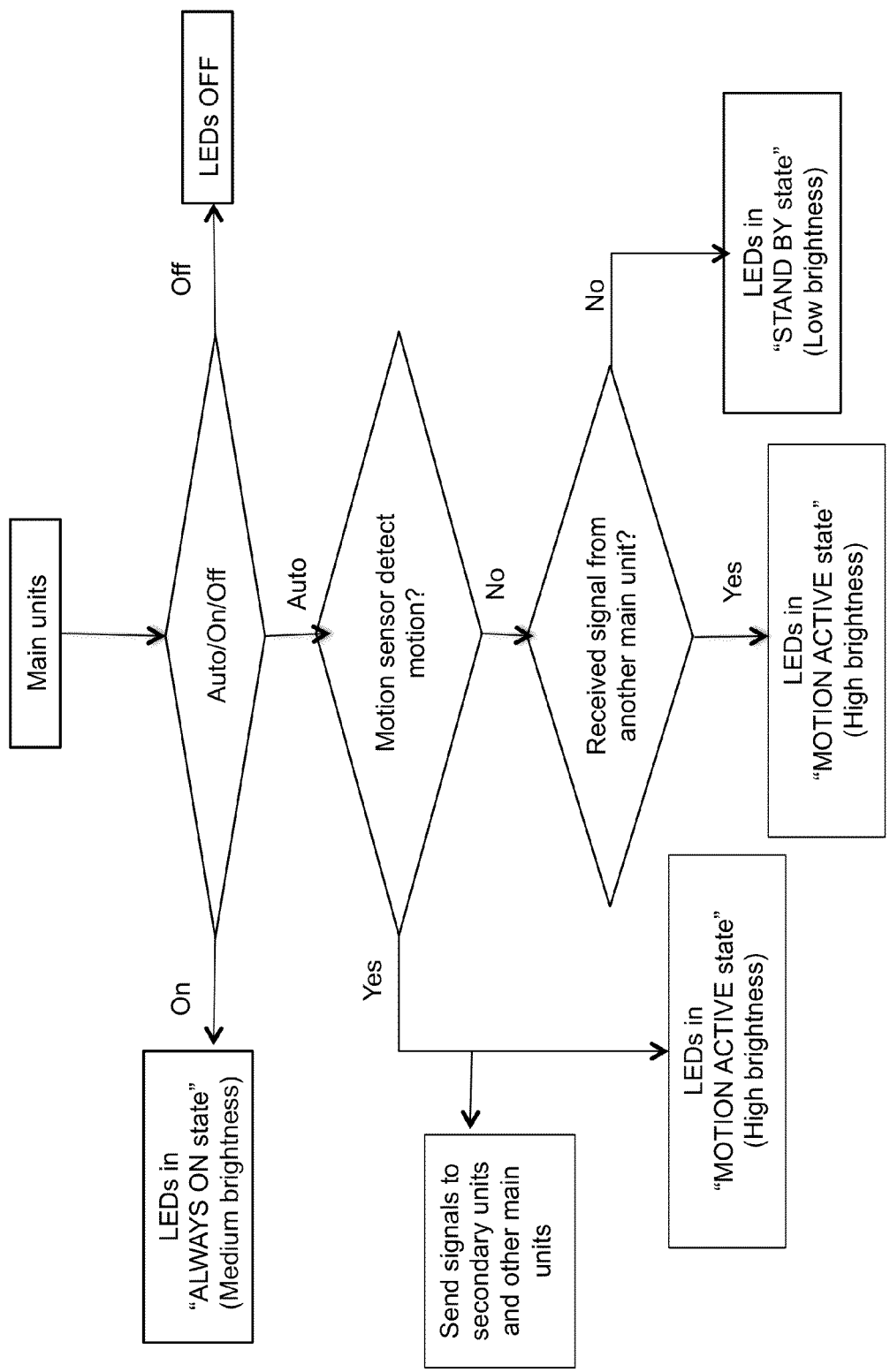
FIG. 12 is a flow chart illustrating an exemplary operation principle of another embodiment of the present invention.

FIG. 11 illustrates a lighting protocol for a secondary unit. The LED in the secondary unit is configured to automatically change its illumination state from STANDBY to ACTIVATED based on the radio frequency input from the transmitter or transceiver from the main unit. LED unit in the secondary unit was change back from the ACTIVATED state to the STANDBY state, after a predetermined activation period if no further radio frequency signal is received from the main unit.

Both FIGS. 10 and 11 further show that the illumination states of the LEDs in the main and secondary units can be adjusted or reset by using the manual switch. The illumination states for LEDs, in accordance with the aspects of the present invention, are distinctive illuminated states. In one example, one state is different from another state at least in the brightness and brightness is measure by the luminous flux of the LED. There are four illumination states of the LEDs, in the distributed lighting network. A first state is an ACTIVATED state, having the highest brightness; a second state is an ALWAYS ON state, having medium brightness; and a third state is a STANDBY state, having lowest brightness. There is also an OFF state, when the LED is powered OFF. Referring to FIGS. 10 and 11, the controllers for the main and secondary units, which include circuit diagrams on the PCB, can only alter the LED from the first illuminated state to the third illuminated state, or vice versa, whereas the manual switch AUTO/ON/OFF, can change the LED from any other states to OFF state, the second or third illumination state but can not achieve ACTIVATED state.

Figure 13:
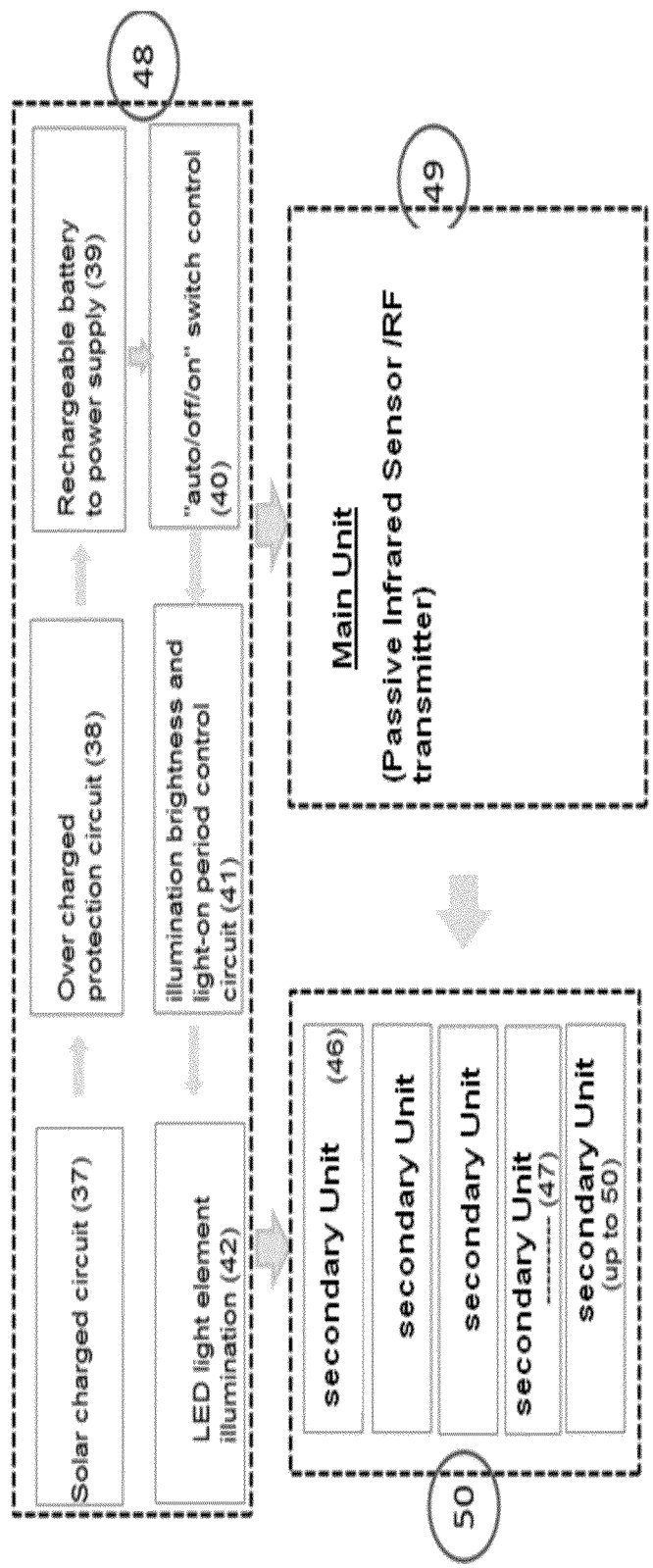
FIG. 13 diagrammatically illustrates a simplified schematic drawing of the communication among an exemplary embodiment having only one main unit.

FIG. 13 further illustrates the working principle of the distributed lighting network where two or more main units are presents and communicating with each other. The main units first decide if a user is present through a motion sensor. If not a logic diagram of main unit will analyze if a wireless signal from another main unit in the same group has been received. Based on the input from the motion sensor and wireless receiver unit, together with the initial illumination setting of the LED in the main unit, the controller will decide to provide operable command for the LED to change its intensity on or after a certain time period. When there are two or more main units present in the same distributed light network, the main unit work as in a two way dialogue with another main unit, and at the same time the main unit can send wireless radio frequency signal to the secondary units within the allowable communication range. The main units all have transceivers to receive wireless signals and send wireless signals either simultaneously or with pre-determined time delay period.

Method of Operation

In one embodiment of the present invention, the distributed lighting network comprises one main unit and between 2 to 50 secondary units, as shown in FIG. 13. Element 48 in FIG. 13 depicts a simplified schematic diagram of the control switch/diagrams/circuits of the main unit.

Solar panel (37) converts light energy into electrical energy and charges the battery (39) with solar charging circuit. An over-charging protection circuit (38) is built in to prevent over charging the battery (39). The recharged battery (39) is designed to provide power to LED (42) for activation. A built-in slide switch "Auto-Off-On" (40) is placed to set or reset the illumination states of the LED (42) to determine the operation states of the main unit. When the switch is slide to OFF manually at any time, the light 42 will be turned off instantaneously. When the switch is slide to ON at any time, the light 42 will be placed to ALWAYS ON state at medium brightness. When the switch is slid to AUTO manually, the slide switch gives up its control of the light 42 to the control circuits of the main unit. The control circuits include motion sensor, brightness, and activation period control circuits. As soon as the manual slid switch is set to AUTO, regardless its initial illumination state, the light 42 is set to the STANDBY state, having low brightness. Once an object passes through the main unit, a motion sensor detects the signal and sends to the control circuits, and the light 42 correspondingly receives an instruction and changes to the ACTIVATED state, having high brightness. At the same time, the main unit sends out radio frequency signals to all the secondary units within the communication range, and all the secondary units will receive the communication wirelessly and change their own LEDs to high brightness till a certain pre-determined time period, all the lights will be back to STAND BY states.

In one aspect of the embodiment of the present invention, the high brightness ACTIVATED state offers higher luminous flux than the medium brightness ALWAYS ON state, and the medium brightness ALWAYS ON state offers higher luminous flux than the low brightness STANDBY state.

In another aspect of the embodiment of the present invention, the predetermined time period for the light to stay at the ACTIVATED state can be preset and reset to any desired values in light of the application requirement and energy conservation considerations.

In a further aspect of the embodiment of the present invention, the brightness for different illumination states and light-on period control circuit (41) can be designed with a different set of values for different models, for different end use applications. In one example, the LEDs employed have a first illumination state at luminous flux of the maximum luminous flux of the LEDs. In another example, the LEDs employed have a first illumination state at a luminous flux less than maximum but more than half of the maximum luminous flux of the LEDs. In still another example, the LEDs employed have a second illumination state having a luminous flux less than that of the first illumination state. In still another example, the LEDs employed have a third illumination state having a luminous flux less than that of the second illumination state.

In one example of the embodiment, when the switch is slid to ON, the light 42 is in the ALWAYS ON state in the dark at brightness of 15 lumens. When the switch is slid to AUTO, the slide switch gives up its control of the light 42 to the control circuits of the main unit. The control circuits include motion sensor, brightness, and activation period control circuits. As soon as the manual slide switch is set to AUTO, regardless its initial illumination state, the light 42 is set to the STANDBY state, staying at about 7.5 lumens. Once an object passes through the main unit, a motion sensor detects the signal and sends it to the control circuits, and the light 42 correspondingly receives an instruction and changes to the ACTIVATED state, having activation at the brightness of 30 lumens. At the same time, the main unit sends out radio frequency signals to all the secondary units to change their own LEDs to a high brightness of 30 lumens. After 2 minutes later, all the lights, both the main unit and the secondary units, will be back to STAND BY states staying at 7.5 lumens.

In the same embodiment of the present invention, referring to FIG. 13, the secondary units also operate with a solar panel, battery and a manual switch just like the main unit operates. Similarly, the solar panel converts light energy into electrical energy and charges the battery with a solar charging circuit. An over-charging protection circuit is built in to prevent over charging the battery. The recharged battery is designed to provide power to the LED for activation. A built-in slid switch "Auto-Off-On" is placed to set or reset the illumination states of the LED in to determine the operation states of the secondary unit. When the switch is slide to OFF manually at any time, the light will be turned off instantaneously. When the switch is slide to ON at any time, the light will be lighted to the ALWAYS ON state in the dark at medium brightness. When the switch is slid to AUTO manually, the slide switch gives up its control of the light to the control circuits of the secondary unit. The control circuits include motion sensor, brightness, and activation period control circuits. As soon as the manual slide switch is set to AUTO, regardless of its initial illumination state, the light is first set to the STANDBY state, having a low brightness. Once the secondary unit, receives a wireless signal from the main unit, the control circuits change the radio frequency input to digital or operable instructions to the light, and light is changed to ACTIVATED state, having a high brightness until a certain pre-determined time period is over, and the light is returned to the STAND BY state.

Figure 14:
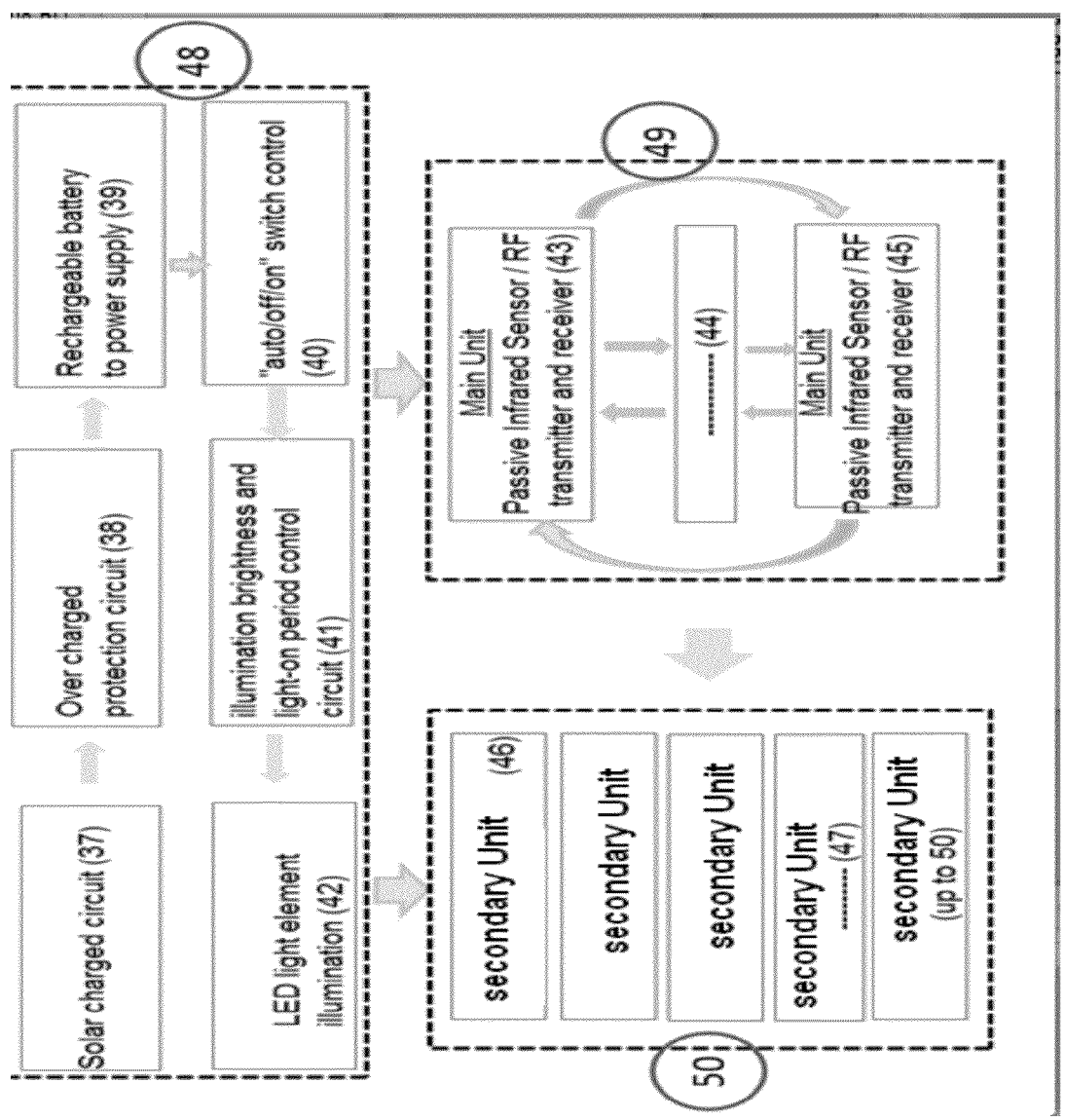
FIG. 14 diagrammatically illustrates a simplified schematic drawing of communication among an exemplary embodiment having multiple main units.

In a second embodiment of the present invention, the distributed lighting network comprises two or more main units and multiple secondary units. As shown in FIG. 14. Element 48 in FIG. 13 depicts a simplified schematic diagram of the control switch/diagrams/circuits of the main unit.

In one example of the second embodiment of the present invention, the networked lighting system comprises a maximum of 50 main units and a maximum 50 secondary units.

When two or more main units are comprised in a networked lighting system, the system including both the main units and secondary units operates identically as main and secondary units described in abovementioned embodiment with only one main unit, except that the main units can additionally receive wireless signals besides sending signals. FIG. 14 shows a simplified schematic view of the operation principle of the embodiment with two or main units. The main units all can communicate with at least one another main unit as either a sender or a receiver. The function of sending and receiving radio frequencies wireless can be combined into a transceiver.

Examples and Test Results

Because the object of the present invention is to provide solar powered intelligent lighting systems, the main and secondary units in the lighting network are primarily for outdoor applications. In some particular embodiments, however, the lighting system can be used indoors or in an enclosed area where there is sufficient sunlight during the day, such as a sun room where is room with all transparent windows on three sides, or a green house wherein sufficient sunlight is passed through all sides of the house throughout the day. Also semi-open or semi-enclosed areas should not be construed to be outside of the scope of the present invention.

Examples of main and secondary units for the present invention illustrated in the drawings are out door lighting units. Some instances of the main and secondary units are garden lights, including but not limited to, stick garden lights and post cap garden lights, as shown in FIG. 9. Another instance of the main and secondary units are mounting lights, which can be mounted to walls, side of steps or stairs, decks, or exposed surfaces of cabinets, shelves, storage bins and the like.

Figure 15:
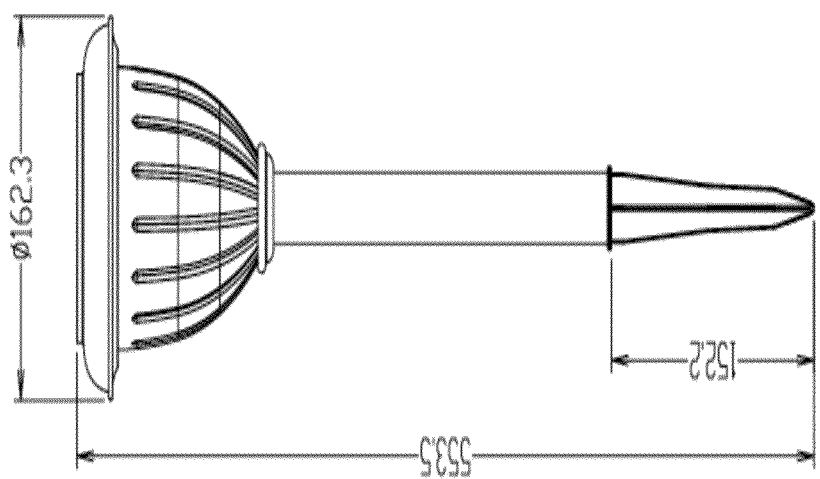
FIG. 15 illustrates a side perspective view of a garden light, in accordance with aspects of the present invention.

FIG. 15 shows specifically a side perspective view of an exemplary stick garden light that is used to test the working principles of the system and collect testing results in FIG. 17 and FIG. 18. The stick garden light used as main and secondary units all are about 533 mm in height and 163 mm in diameter. The exemplary garden light in FIG. 15 comprises a top cover, housing with lampshades, an extension tube and a stake.

Figure 16:
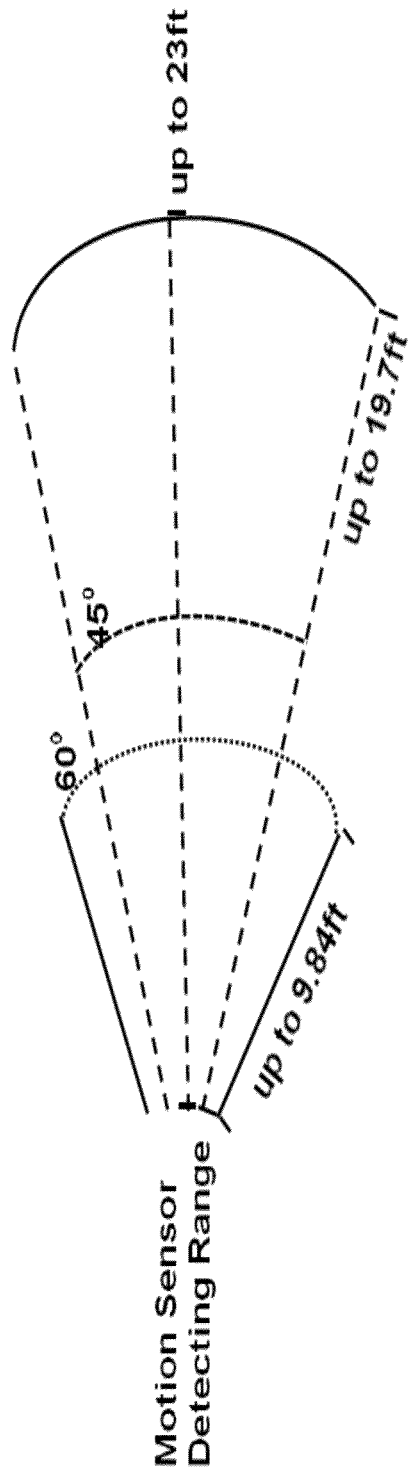
FIG. 16 is a table summary of the test results for motion sensors for both a main unit and secondary units.

In one experimental system, one main unit and five secondary units are assembled into one networked lighting system. Testing results are summarized in FIGS. 16-18. FIG. 16 summarizes the overall performance of the lighting system including motion sensor detection range and actual collected data about the activated period for the main and five secondary units. As shown, the motion sensor of the main unit sensed motion up to about 10 feet for a 60 degree angle, up to 20 feet for a 45 degree angle and up to 23 feet for the center. The secondary units received radio frequency wireless signal up to 120 feet in an open space and up to 190 feet in semi-open area like a corridor. The motion activation periods actually measured were all about 2 minutes with reasonable experimental errors for the secondary units. The emission spectrum and CIE color coordinate for the main unit, brightness of the main unit with and without lampshades for each state, is summarized in FIG. 17. A selected emission spectrum and CIE color coordinate for one secondary unit, and an average brightness with and without lampshades for each state is summarized in FIG. 18. FIGS. 17 and 18 jointly show that light in main and secondary units have a brightness of 9-14 lumens for ALWAYS ON state, 4-7 lumens for STANDBY state and 22-31 lumens for ACTIVATED or motion activated state.

In another experimental system, two main units and a few secondary units are assembled into a networked lighting system. The lighting system was intended to provide illumination to an area from a gated entrance to the yard to the front entrance of a residential house. Main units were labeled as A and B for clarity.

Main unit (A) was assembled to the gated entrance to the front yard of a residential house whereas main unit (B) was assembled at the front entrance of the house. When someone or something passed through the gate, the PIR sensor of main unit (A) was activated, and sent out wireless RF signals to all the units including all the secondary units and the main unit (B), and all the unit is turned to ACTIVATED states at 30 lumens of light. When someone or something passed through the front entrance of the house, the PIR sensor of main unit (B) was activated, which in turn sent out wireless RF signals to all the systems including all the secondary units and main unit (A), and all the lights in the system turned on to provide 30 lumens of light.

Figure 19A:
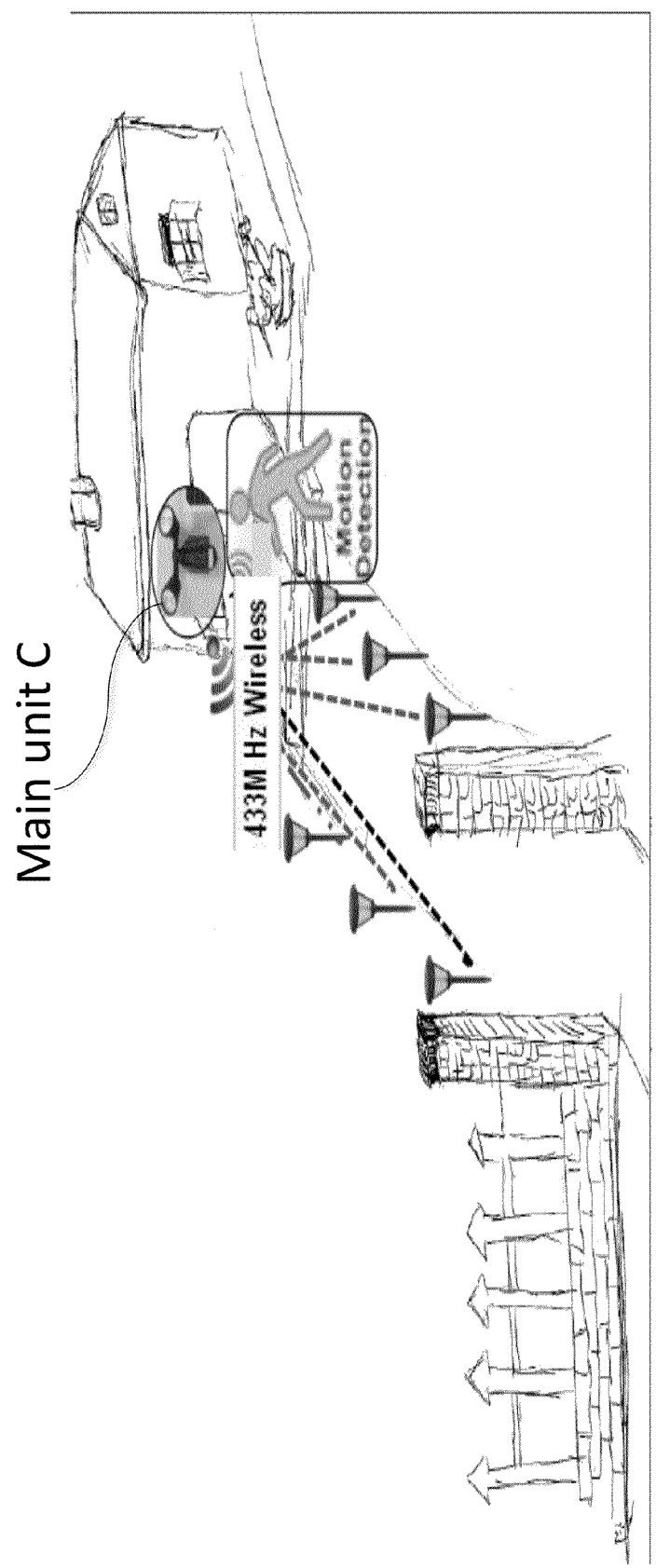
FIGS. 19a-c are illustrations of an exemplary embodiment in accordance with the aspect of the present invention.
Figure 19B:
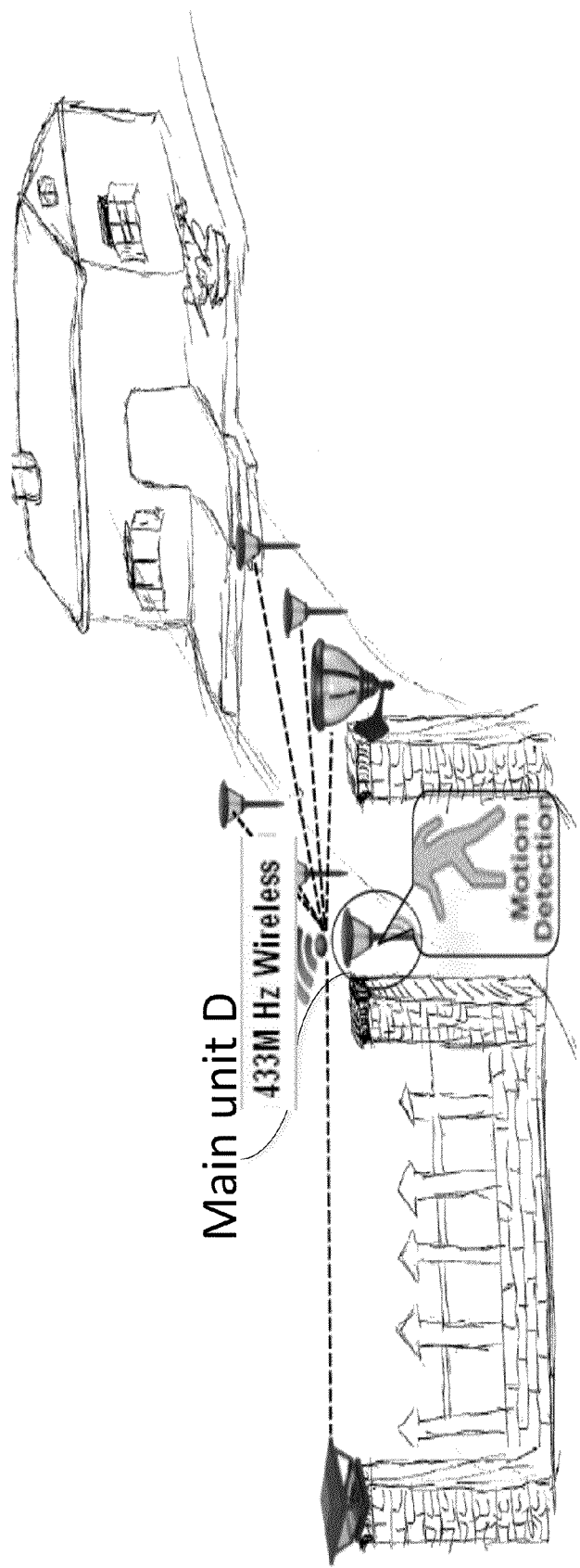
Figure 19C:
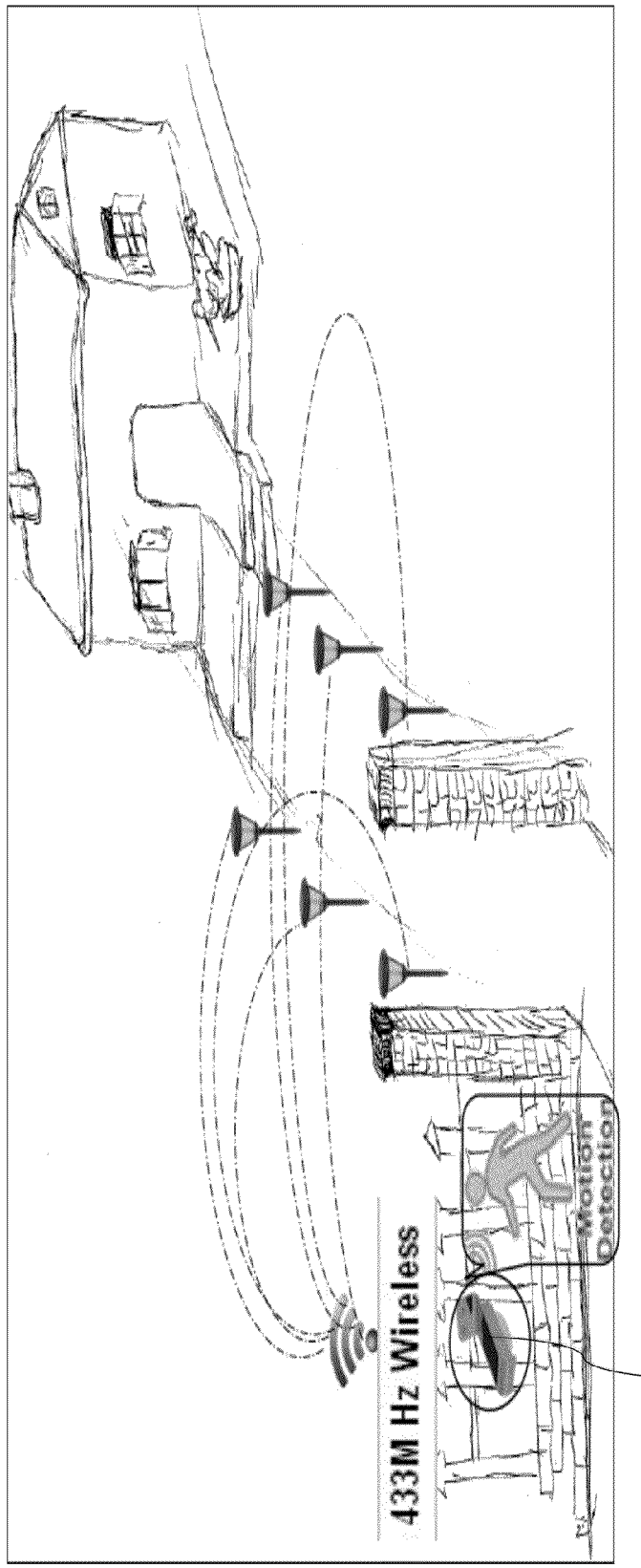

FIGS. 19a-c illustrate another experimental layout of the networked solar lighting system. FIGS. 19a-c show that the system includes three main units and seven secondary units. One main unit (C), drawn in FIG. 19a, is a mounting light positioned on the wall above the entrance of the house. Another main unit (D), drawn in FIG. 19b, is located on the left corner where garden path leads to pedestrian walk. A still another main unit (E), drawn in FIG. 19c, is mounted on the fence of next to the pedestrian walk. The secondary units include five stick garden lights distributed on both sides of the path between the entrances of the gate and the house, one additional post cap garden light sited on top of the resting support and another garden, substantially half egg shaped, hang from another resting support.

As someone left the house and walked towards the street, the person passes through the front entrance of the house first, and the main unit C sensed the motion and sent out wireless signals to all the units, including main units D and E for activation instructions. Subsequently, as the person walked away from the main entrance to the gate, the main unit D sensed the motion and sent out a second wireless signal to main units C and E, together with all the secondary units. Then when the person was at the pedestrian walk leaving the gate, the main unit E sensed motion and sent instructions to all the other units.

Although few embodiments of the present invention have been illustrated and described, it would be appreciated by those skilled in the art that changes may be made in these embodiments without departing from the principles and spirit of the invention. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein. As used in this disclosure, the term "preferably" is non-exclusive and means "preferably, but not limited to." Terms in the claims should be given their broadest interpretation consistent with the general inventive concept as set forth in this description.

What is claimed is:

1. An area lighting system comprising:
   two main units, each comprising at least one LED and a controller, both main units are configured to receive a signal from a motion sensor, activate a wireless transceiver based on the signal from the motion sensor and send out a radio frequency signal;
   both main units, capable of receiving a radio frequency signal from a wireless transceiver from another main unit directly;
   multiple secondary units, each comprising at least one LED and a controller,
   wherein the each secondary unit is configured to receive, a radio frequency signal from the transceivers of the main units and change the illumination state of the LEDs of the secondary unit;
   wherein the main units and secondary units, each comprising three illumination states and an OFF state, wherein
   a first illumination state has luminous flux greater than a second illumination state,
   a second illumination state has luminous flux greater than a third illumination state;
   wherein each main and secondary unit has an individual manual switch attached thereon, each individual manual switch comprising an AUTO state and at least one other state, either an ON or OFF; the main and secondary units are changed from any other illumination state to the second and third illumination states, and OFF state through said switch but not to the first illumination state, which can only be set according to the motion sensor or the wireless transceiver; and when the individual manual switch is not set to AUTO, the main and secondary units will not change their illumination states in response to the motion sensor or the wireless transceiver,
   when the individual manual switch is set to AUTO, at least one illumination state including the second illumination state or the OFF can not be achieved,
   and
   wherein all the main units and secondary units are wireless garden lights.

2. The area lighting system of claim 1, wherein the individual manual switch is a slide switch.

3. The area lighting system of claim 1, wherein the individual manual switch is a 3 level AUTO/ON/OFF switch, wherein the AUTO state is controlled by a control circuit, which takes input from the motion sensor and/or the wireless transceiver.

4. The area lighting system of claim 1, wherein each main and secondary unit further comprises a solar panel attached on the top surface thereon.

5. The area lighting system of claim 1, wherein the LEDs are changed from the third illumination state to the first illumination state or from the first illumination state to the third illumination state through the controllers attached thereon.

6. The area lighting system of claim 5, wherein the controllers of the main units and secondary units, each comprising a timing component and a brightness component, and operate based on the inputs from the motion sensors signal and radio frequency signals, along with the initial illumination state of the LED and the setting of the timing component.

7. The area lighting system of claim 4, wherein all the main units and secondary units are powered by rechargeable batteries.

8. The area lighting system of claim 7, wherein all rechargeable batteries are charged by solar cells attached to the units.

9. The area lighting system of claim 8, wherein the garden lights include stick yard lights, post cap lights and mounting lamps.

10. The area lighting system of claim 1, wherein all the main units and secondary units have one LED.

11. The area lighting system of claim 1, wherein all the main units and secondary units have maximum brightness of 50 lm.

12. The area lighting system of claim 1, wherein the first illumination state has luminous flux less than 35 lm.

13. The area lighting system of claim 1, wherein the third illumination state has luminous flux between 2-10 lm.

14. The area lighting system of claim 1, wherein the main units and secondary units are arranged as path lights.

15. A method of operating a lighting system having a distributed lighting network, comprising a first and a second main unit, each having at least one LED and a 3-level AUTO/ON/OFF switch and more than one secondary units, each having at least one LED and 3-level AUTO/ON/OFF switch, wherein each LED in the main and secondary units have three distinctive illumination states, including ACTIVATED, ALWAYS ON and STANDBY states, and the 3-level AUTO/ON/OFF switch cannot set the LED to the ACTIVATED state, comprising the steps of: charging rechargeable batteries by solar panels adhered on the top of each main and secondary unit; preventing battery over-charge using an over-charging protection circuit; providing power to each at least one LED in the main and secondary units through the respective rechargeable batteries, which; selecting the switch of the each main and secondary unit to the "AUTO" state; powering on the main and secondary units to their STANDBY illumination states; sensing an object through a motion sensor enclosed in the same housing of the LED in a first main unit; operating the at least one LED in the first main unit to an ACTIVATED state having a high brightness after detecting proximity of an object by the motion sensor; sending out at least one radio frequency signal wirelessly by the first main unit; changing the illumination state of the at least one LED in the secondary unit to the ACTIVATED state, having a high brightness after the receiving radio frequency signal from the first main unit; changing the illumination state of the at least one LED in a second main unit to the ACTIVATED state, having a high brightness after receiving radio frequency signal from the first main unit; changing the illumination state of the at least one LED in the first main unit from the ACTIVATED state to the STANDBY state after a first predetermined time period; changing the illumination state of the at least one LED in the secondary unit from the ACTIVATED state to the STANDBY state after a second predetermined time period; and changing the illumination state of the at least one LED in the second main unit from the ACTIVATED state to STANDBY state after a third predetermined time period; sending a radio frequency signal from the second main unit to the first main unit and receiving the wireless signal by the first main unit; wherein at least one of the main units is a wireless garden light.

16. The method of claim 15, wherein the first, second and third predetermined time periods are all about 1.5-3 minutes.

17. The method of claim 15, wherein the method further comprises sensing an object through a motion sensor enclosed in the same housing of the at least one LED in a second main unit when the light is in the ACTIVATED state.

* * * * *